US012528186B2

(12) United States Patent
Sermanet et al.

(10) Patent No.: US 12,528,186 B2
(45) Date of Patent: Jan. 20, 2026

(54) TRAINING AND/OR UTILIZING MACHINE LEARNING MODEL(S) FOR USE IN NATURAL LANGUAGE BASED ROBOTIC CONTROL

(71) Applicant: GOOGLE LLC, Mountain View, CA (US)

(72) Inventors: Pierre Sermanet, Palo Alto, CA (US); Corey Lynch, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 342 days.

(21) Appl. No.: 17/924,891

(22) PCT Filed: May 14, 2021

(86) PCT No.: PCT/US2021/032499
§ 371 (c)(1),
(2) Date: Nov. 11, 2022

(87) PCT Pub. No.: WO2021/231895
PCT Pub. Date: Nov. 18, 2021

(65) Prior Publication Data
US 2023/0182296 A1 Jun. 15, 2023

Related U.S. Application Data

(60) Provisional application No. 63/024,996, filed on May 14, 2020.

(51) Int. Cl.
B25J 9/16 (2006.01)
(52) U.S. Cl.
CPC ............ B25J 9/1664 (2013.01); B25J 9/163 (2013.01); B25J 9/1697 (2013.01)

(58) Field of Classification Search
None
See application file for complete search history.

(56) References Cited

U.S. PATENT DOCUMENTS

2019/0206400 A1 7/2019 Cui
2020/0103978 A1 4/2020 Mixter et al.
2020/0104680 A1 4/2020 Reed

FOREIGN PATENT DOCUMENTS

KR 20180137026 12/2018
KR 101997072 10/2019
WO 2019183568 9/2019

OTHER PUBLICATIONS

Luke Richards et al., 'A Manifold Alignment Approach to Grounded Language Learning', 2019, 8th Northeast Robotics Colloquium. (Year: 2019).*

(Continued)

Primary Examiner — Jason Holloway
Assistant Examiner — Christopher A Buksa
(74) Attorney, Agent, or Firm — Gray Ice Higdon

(57) ABSTRACT

Techniques are disclosed that enable training a goal-conditioned policy based on multiple data sets, where each of the data sets describes a robot task in a different way. For example, the multiple data sets can include: a goal image data set, where the task is captured in the goal image; a natural language instruction data set, where the task is described in the natural language instruction; a task ID data set, where the task is described by the task ID, etc. In various implementations, each of the multiple data sets has a corresponding encoder, where the encoders are trained to generate a shared latent space representation of the corresponding task description. Additional or alternative techniques are disclosed that enable control of a robot using a goal-conditioned policy network. For example, the robot can be controlled, using the goal-conditioned policy network, (Continued)

based on free-form natural language input describing robot task(s).

13 Claims, 8 Drawing Sheets

(56) References Cited

OTHER PUBLICATIONS

Rahmatizadeh, Rouhollah et al.; Vision-Based Multi-Task Manipulation for Inexpensive Robots Using End-To-End Learning from Demonstration; IEEE International Conference on Robotics and Automation; 8 pages; dated Apr. 2018.
Kalashnikov, Dmitry, et al. "QT-Opt: Scalable Deep Reinforcement Learning for Vision-Based Robotic Manipulation." arXiv:1806.10293v3 [cs.LG] Nov. 28, 2018; 23 pages.
Sermanet, P. et al., "Time-Contrastive Networks: Self-Supervised Learning from Video;" 2018 International Conference on Robotics and Automation; pp. 1134-1141; May 21, 2018.
Rajeswaran, Aravind et al.; Learning complex dexterous manipulation with deep reinforcement learning and demonstrations; arXiv preprint arXiv:1709.10087; 9 pages; dated 2017.
Schaul, Tom et al.; Universal value function approximators; In International Conference on Machine Learning; 9 pages; dated 2015.
Todorov, Emanuel et al.; Mujoco: A physics engine for model-based control. In Intelligent Robots and Systems (IROS), IEEE/RSJ; p. 5026-5033; dated 2012.
Levine, S. et al. "End-to-End Training of Deep Visuomotor Policies;" Journal of Machine Learning Research, 17; 40 pages; Apr. 2016.
Radford, A.; Language Models are Unsupervised Multitask Learners; 24 pages; dated 2019.
Haarnoja, T. et al., "Soft Actor-Critic Algorithms and Applications;" Cornell University; arXiv.org; arXiv:1812.05905v1; 18 pages; Dec. 13, 2018.
Van den Oord, A. et al., "Representation Learning with Contrastive Predictive Coding," Cornell University; arXiv.org; arXiv:1807.03748v1; 13 pages; Jul. 10, 2018.
Huang, H. et al., "Transferable Representation Learning in Vision-and-Language Navigation;" IEEE/CVF International Conference on Computer Vision (ICCV); pp. 7404-7413; Oct. 27, 2019.
Chai, J. et al., "Language to Action: Towards Interactive Task Learning with Physical Agents;" Proceedings of the 27th International Joint Conference on Artificial Intelligence; 8 pages; Jul. 1, 2018.
Lynch, C. et al., "Learning Latent Plans from Play;" arXiv.org, arXiv:1903.01973v1; 14 pages; dated Mar. 5, 2019.
Stepputtis, S. et al., "Imitation Learning of Robot Policies by Combining Language, Vision and Demonstration;" arXiv.org, arXiv:1911.11744v1; 6 pages; dated Nov. 26, 2019.
Sharma, P. et al., "Multiple Interactions Made Easy (MIME): Large Scale Demonstrations Data for Imitation;" arXiv.org, arXiv: 1810.07121v1; 10 pages; dated Oct. 16, 2018.
Wang, X. et al., "Reinforced Cross-Modal Matching and Self-Supervised Imitation Learning for Vision-Language Navigation;" 2019 IEEE/CVF Conference on Computer Vision and Pattern Recognition (CVPR); 10 pages; Jun. 15, 2019.
European Patent Office; International Search Report and Written Opinion of PCT/US2021/032499; 16 pages; dated Aug. 26, 2021.
Atkeson, C. G., et al., "Robot Learning from Demonstration;" In ICML, vol. 97; 9 pages; dated 1997.
Mooney, R.J., "Learning to Connect Language and Perception;" In Association for the Advancement of Artificial Intelligence (AAAI); pp. 1598-1601; dated 2008.
Oh, J. et al., "Zero-Shot Task Generalization with Multi-Task Deep Reinforcement Learning;" In Proceedings of the 34th International Conference on Machine Learning—vol. 70, 10 pages; dated 2017.
Raffel, C. et al., "Exploring the Limits of Transfer Learning with a Unified To-Text Transformer;" arXiv.org; arXiv:1910.10683v2; 53 pages; dated Oct. 24, 2019.
Salimans, T. et al., "PixelCNN++: Improving the pixelCNN with Discretized Logistic Mixture Likelihood and Other Modifications;" International Conference on Learning Representations; 10 pages; dated 2017.
Schaul, T. et al., "Ray Interference: A Source of Plateaus in Deep Reinforcement Learning;" arXiv.org; arXiv:1904.11455v1; 17 pages; dated Apr. 25, 2019.
Schmidhuber, Jurgen, "Formal Theory of Creativity, Fun, and Intrinsic Motivation;" IEEE Transactions on Autonomous Mental Development, vol. 2, No. 3; pp. 230-247; dated Sep. 2010.
Sennrich, R. et al., "Neural Machine Translation of Rare Words with Subword Units;" arXiv.org; arXiv:1508.07909v2; 11 pages; dated Nov. 27, 2015.
Sermanet, P. et al., "Unsupervised Perceptual Rewards for Imitation Learning;" Proceedings of Robotics: Science and Systems (RSS), 2017; arxiv.org; arXiv:1612.06699v3; 15 pages; dated 2017.
Shridhar, M. et al., "Alfred: A Benchmark for Interpreting Grounded Instructions for Everyday Tasks;" In the IEEE Conference on Computer Vision and Pattern Recognition (CVPR) 2020; arxiv.org; arXiv:1912.01734v2; 18 pages; dated 2020.
Singh, A. et al., "End-to-End Robotic Reinforcement Learning Without Reward Engineering;" arXiv.org; arXiv:1904.07854v2; 14 pages; dated Mar. 16, 2019.
Singh, A. et al., "Scalable Multi-Task Imitation Learning with Autonomous Improvement;" arXiv.org; arXiv:2003.02636v1; 7 pages; dated Feb. 25, 2020.
Smith, L. et al., "The Development of Embodied Cognition: Six Lessons from Babies;" Artificial Life, vol. 11, Issue 1-2; pp. 13-29; dated Jan. 2005.
Tan, C. et al., "A Survey on Deep Transfer Learning;" In International Conference on Artificial Neural Networks; Springer; 10 pages, dated 2018.
Teh, Y.W. et al., "Distral: Robust Multitask Reinforcement Learning;" In Advances in Neural Information Processing Systems; 11 pages; dated 2017.
Tenney, I. et al., "What do you learn from context? probing for sentence structure in contextualized word representations;" International Conference on Learning Representations (ICLR); 17 pages; dated 2019.
Thrun, S.B.; "Efficient Exploration in Reinforcement Learning;" Citeseer; Technical Report CMU-CS-92-102; 44 pages; dated 1992.
Verga, L. et al., "How Relevant Is Social Interaction in Second Language Learning?" Frontiers in Human Neuroscience, vol. 7, Article 550; 7 pages; dated Sep. 2013.
Warde-Farley, D. et al., "Unsupervised Control Through Non-Parametric Discriminative Rewards;" arXiv.org; arXiv:1811.11359v1; 17 pages; dated Nov. 28, 2018.
Yang, Y. et al., "Multilingual Universal Sentence En-coder for Semantic Retrieval;" arXiv.org; arXiv:1907.04307v1; 6 pages; dated Jul. 9, 2019.
Yu, H. et al., "A Deep Compositional Framework for Human-Like Language Acquisition in Virtual Environment;" arXiv.org; arXiv:1703.09831v3; 16 pages; dated May 19, 2017.
Yu, H. et al., "Interactive Grounded Language Acquisition and Generalization in a 2D World;" arXiv.org; arXiv:1802.01433v4; 29 pages; dated Aug. 13, 2013.
Yu, T. et al., "Meta-World: A Benchmark and Evaluation for Multi-Task and Meta Reinforcement Learning;" arXiv.org; arXiv:1910.10897v1; 18 pages; dated Oct. 24, 2019.
Zellers, R. et al., "Swag: A Large-Scale Adversarial Dataset for Grounded Commonsense Inference;" arXiv.org; arXiv:1808.05326v1; 15 pages; dated Aug. 16, 2018.
Zhang, T. et al., "Deep Imitation Learning for Complex Manipulation Tasks from Virtual Reality Teleoperation;" In IEEE International Conference on Robotics and Automation (ICRA); pp. 5628-5635; dated 2018.
Japanese Patent Office; Notice of Reasons for Rejection issued in Application No. 2022565890; 6 pages; dated Sep. 4, 2023.

(56) References Cited

OTHER PUBLICATIONS

European Patent Office; Communication pursuant to Article 94(3) EPC issued in Application No. 21730747.9 9 pages; dated Aug. 13, 2024.
Andreas, J. et al., "Modular Multitask Reinforcement Learning with Policy Sketches;" International Conference on Machine Learning (ICML); 10 pages; dated 2016.
Andrychowicz, M. et al.; Hindsight Experience Replay;31st Conference on Neural Information Processing Systems; 11 pages; dated 2017.
Andrychowicz, M. et al., Open AI; "Learning Dexterous In-Hand Manipulation;" The International Journal of Robotics Research, 39(1); pp. 3-20; dated 2020.
Argall, B. et al. "A Survey of Robot Learning from Demonstration"; Robotics and Autonomous Systems, Elsevier BV, vol. 57, No. 5, pp. 469-483; May 31, 2009.
Bisk, Y. et al., "Experience Grounds Language;" arXiv.org; arXiv:2004.10151v3; 18 pages; dated Nov. 2, 2020.
Caruana, R.; "Multitask Learning;" Springer; Machine learning, 28(1) pp. 41-75; dated 1997.
Chaplot, D.S. et al., "Gated-Attention Architectures for Task-Oriented Language Grounding;" In Thirty-Second AAAI Conference on Artificial Intelligence; 8 pages; dated 2018.
Clark, H.H. et al., "Grounding in Communication;" American Psychological Association; psycnet.apa.org; 12 pages; dated 1991.
Das, A. et al., "Embodied Question Answering;" In Proceedings of the IEEE Conference on Computer Vision and Pattern Recognition Workshops (CVPR); 10 pages; dated 2018.
Devlin, J. et al., "BERT: Pre-training of Deep Bidirectional Transformers for Language Understanding;" arXiv preprint arXiv:1810.04805v1; 14 pages; dated Oct. 11, 2018.
Ding, Y. et al., "Goal-conditioned Imitation Learning;" In Advances in Neural Information Processing Systems; 12 pages; dated 2019.
Duan, Y. et al., "One-Shot Imitation Learning;" In Advances in Neural Information Processing Systems; 12 pages, dated 2017.
Ebert, F. et al., Visual Foresight: Model-Based Deep Reinforcement Learning for Vision-Based Robotic Control; arXiv.org; arXiv:1812.00568v1; 14 pages; dated Dec. 3, 2018.
Eysenbach, B. et al., Rewriting History with Inverse RL: Hindsight Inference for Policy Improvement; arXiv.org; arXiv:2002.11089v1; 16 pages; dated Feb. 25, 2020.
Florensa, C. et al. "Self-supervised Learning of Image Embedding for Continuous Control;" arXiv.org; arXiv:1901.00943v1; 11 pages; dated Jan. 3, 2019.
Ghosh, D. et al., "Learning to Reach Goals without Reinforcement Learning;" arXiv.org; arXiv:1912.06088v2; 16 pages; dated Dec. 13, 2019.
Goldberg, Y. et al., "Assessing BERT's Syntactic Abilities;" arXiv.org; arXiv:1901.05287v1; 4 pages; dated Jan. 16, 2019.
Goyal, P. et al., Using Natural Language for Reward Shaping in Reinforcement Learning; arXiv.org; arXiv:1903.02020v2; 10 pages; dated May 31, 2019.
Gu, S. et al., "Deep Reinforcement Learning for Robotic Manipulation with Asynchronous Off-Policy Updates;" IEEE International Conference on Robotics and Automation (ICRA); pp. 3389-3396; dated 2017.
Gupta, A. et al., "Relay Policy Learning: Solving Long Horizon Tasks via Imitation and Reinforcement Learning;" Conference on Robot Learning (CoRL); 13 pages; dated 2019.
Ha, D. et al., "World Models;" arXiv.org; arXiv:1803.10122v4; 21 pages; dated May 9, 2018.
Hafner, D. et al., "Learning Latent Dynamics for Planning from Pixels;" arXiv.org; arXiv:1811.04551v2; 18 pages; dated Dec. 3, 2018.
Handa, A. et al., "DexPilot: Vision Based Teleoperation of Dexterous Robotic Hand-Arm System;" arXiv.org; arXiv:1910.03135v2; 18 pages; dated Oct. 14, 2019.
Harnad, S., "The Symbol Grounding Problem;" Physica D: Nonlinear Phenomena, 42(1-3); 15 pages; dated 1990.
Hermann, K. M. et al., "Grounded Language Learning in a Simulated 3D World;" arXiv.org; arXiv:1706.06551v2; 22 pages; dated Jun. 26, 2017.
Hester, T. et al., "Deep Q-Learning from Demonstrations;" The Thirty-Second AAAI Conference on Artificial Intelligence (AAAI-18), 8 pages; 2018.
Hill, F. et al., "Emergent Systematic Generalization in a Situated Agent;" arXiv preprint arXiv:1910.00571v2; 14 pages; dated Oct. 28, 2019.
Howard, J. et al., "Universal Language Model Fine-turning for Text Classification;" arXiv.org; arXiv:1801.06146v5; 12 pages; dated May 23, 2018.
Jiang et al., "Language as an Abstraction for Hierarchical Deep Reinforcement Learning" arXiv:1906.07343v2 [cs.LG] dated Nov. 18, 2019. 25 pages.
Kaelbling, L.P., "Learning to Achieve Goals;" In IJCAI; Citeseer; 5 pages; dated 1993.
Kober, J. et al., "Reinforcement Learning in Robotics: A Survey;" The International Journal of Robotics Research; 37 pages; 2013.
Kollar, T. et al.; "Toward Understanding Natural Language Directions;" In 2010 5th ACM/IEEE International Conference on Human-Robot Interaction (HRI); pp. 259-266; dated 2010.
Kolter, J. Z. et al., "Near-Bayesian Exploration in Polynomial Time;" In Proceedings of the 26th Annual Interna-tional Conference on Machine Learning; 10 pages; dated 2009.
Lee, L. et al., "Efficient Exploration via State Marginal Matching;" arXiv.org; arXiv:1906.05274v2; 19 pages; dated Oct. 4, 2019.
Luketina, J. et al., "A Survey of Reinforcement Learning Informed by Natural Language;" arXiv.org; arXiv:1906.03926v1; 9 pages; dated Jun. 10, 2019.
Lynch, C. et al., "Learning Latent Plans from Play;" Conference on Robot Learning (CoRL); https://arxiv.org/abs/1903.01973v2; 17 pages; dated Dec. 20, 2019.
MacMahon, M. et al., "Walk the Talk: Connecting Language, Knowledge, and Action in Route Instructions;" Def, 2(6):4; 8 pages; dated 2006.
Misra, D. et al., Mapping Instructions and Visual Observations to Actions with Reinforcement Learning; arXiv.org; arXiv:1704.08795v2; 16 pages; dated Jul. 22, 2017.
Nair, A. et al., "Contextual Imagined Goals for Self-Supervised Robotic Learning;" arXiv.org; arXiv:1910.11670v1; 12 pages; dated Oct. 23, 2019.
Nair, A. et al., "Visual Reinforcement Learning with Imagined Goals;" In Advances in Neural Information Processing Systems; 10 pages; dated 2018.
Oh, J. et al.; Action-conditional Video Prediction Using Deep Networks in Atari Games. In Advances in Neural Information Processing Systems; pp. 1-9; dated 2015.
Oudeyer, P-Y. et al., "How Can We Define Intrinsic Motivation?" In Proceedings of the 8th Conference on Epigenetic Robotics; 9 pages; dated 2008.
Ozair, S. et al., "Wasserstein Dependency Measure for Representation Learning;" In Advances in Neural Information Processing Systems; 11 pages; dated 2019.
Parisotto, E. et al., "Actor-Mimic: Deep Multitask and Transfer Reinforcement Learning;" arXiv.org; arXiv:1511.06342v2; 15 pages; dated Nov. 20, 2015.
Pathak, D. et al., "Curiosity-driven Exploration by Self-supervised Prediction;" In Proceedings of the IEEE Conference on Computer Vision and Pattern Recognition Workshops; pp. 16-17; dated 2017.
Pirk, S. et al., "Online Object Representations with Contrastive Learning;" arXiv.org; arXiv:1906.04312v1; 15 pages; dated Jun. 10, 2019.
Pong, V. et al., "Temporal Difference Models: Model-Free Deep RL for Model-Based Control;" arXiv.org; arXiv:1802.09081v1; 14 pages; dated Feb. 25, 2018.
Pong, V. H. et al., "Skew-Fit: State-Covering Self-Supervised Reinforcement Learning;" arXiv.org; arXiv:1903.03698v2; 23 pages; dated May 31, 2019.
Popov, I. et al., "Data-efficient Deep Reinforcement Learning for Dexterous Manipulation;" arXiv.org; arXiv:1704.03073; 12 pages; dated 2017.

(56) References Cited

OTHER PUBLICATIONS

China National Intellectual Property Administration; Notification of First Office Action issued in Application No. 202180034023.2; 17 pages; dated Jan. 14, 2025.
China National Intellectual Property Administration; Notice of Grant issued in Application No. 202180034023.2; 6 pages; dated May 21, 2025.
Korean Patent Office; Notice of Office Action issued in Application No. 1020227042611; 14 pages; dated Dec. 18, 2024.

* cited by examiner

TRAINING AND/OR UTILIZING MACHINE LEARNING MODEL(S) FOR USE IN NATURAL LANGUAGE BASED ROBOTIC CONTROL

BACKGROUND

Many robots are programmed to perform certain tasks. For example, a robot on an assembly line can be programmed to recognize certain objects, and perform particular manipulations to those certain objects.

Further, some robots can perform certain tasks in response to explicit user interface input that corresponds to the certain task. For example, a vacuuming robot can perform a general vacuuming task in response to a spoken utterance of "robot, clean". However, typically, user interface inputs that cause a robot to perform a certain task must be mapped explicitly to the task. Accordingly, a robot can be unable to perform certain tasks in response to various free-form natural language inputs of a user attempting to control the robot. For example, a robot may be unable to navigate to a goal location based on free-form natural language input provided by a user. For instance, a robot can be unable to navigate to a particular location in response to a user request of "go out the door, turn left, and go through the door at the end of the hallway."

SUMMARY

Techniques disclosed herein are directed towards training a goal-conditioned policy network based on multiple datasets, where training tasks are described in a different way in each of the datasets. For example, a robot task can be described using a goal image, using natural language text, using a task ID, using natural language speech, and/or using additional or alternative task description(s). For instance, a robot can be trained to perform the task of putting a ball into a cup. A goal image description of the example task may be a picture of the ball inside the cup, a natural language text description of the task may be a natural language instruction of "put the ball into the mug", and a task ID description of the task may be "task id=4", where 4 is the ID associated with the task of placing the ball into the cup. In some implementations, multiple encoders can be trained (i.e., one encoder per dataset) such that each encoder can generate a shared latent goal space representation of a task by processing the task description. In other words, different ways of describing the same task (e.g., an image of the ball in a cup, natural language instructions of "put the ball into the mug", and/or "task id=4") can map to the same latent goal representation based on processing the task descriptions with the corresponding encoder. While techniques described herein are directed towards training a robot to perform tasks, this is not meant to be limiting. Additional and/or alternative networks can be trained based on multiple datasets, each of the datasets having a different context, in accordance with techniques described herein.

Additional or alternative implementations are directed towards controlling a robot based on output generated using a goal-conditioned policy network. In some implementations, the robot can be trained using multiple datasets (e.g., trained using a goal image dataset and a natural language instruction dataset), and only one task description type can be used at inference time to describe the task(s) for the robot (e.g., providing the system with only natural language instructions, only goal images, only task IDs, etc. at inference). For example, a system can be trained based on a goal image data set and a natural language instruction dataset, where the system is provided with natural language instructions to describe tasks for the robot at runtime. Additionally or alternatively, in some implementations the system can be provided with multiple instruction description types at runtime (e.g., provided with natural language instructions, goal images, and task IDs at runtime, provided with natural language instructions and task IDs at runtime, etc.). For example, a system can be trained based on a natural language instruction dataset and a goal image dataset, where the system can be provided with natural language instructions and/or goal image instructions at runtime.

In some implementations, a robot agent may achieve task agnostic control using a goal-conditioned policy network, where a single robot is able to reach any reachable goal state in its environment. In conventional teleoperated multitask demonstrations, the diversity of the collected data may be constrained to an upfront task definition (e.g., human operators are provided with a list of tasks to demonstrate). In contrast, the human operator in teleoperated "play" is not constrained to a set of predefined tasks when generating play data. In some implementations, a goal image dataset can be generated based on teleoperated "play" data. Play data can include continuous logs (e.g., a data stream) of low-level observations and actions collected while a human teleoperates a robot and engages in behavior that satisfies their own curiosity. Collecting play data, unlike collecting expert demonstrations, may not require task segmenting, labeling, or resetting to an initial state, thus enabling play data to be quickly collected in large quantities. Additionally or alternatively, play data may be structured based on human knowledge of object affordances (e.g., if people see a button in a scene, they tend to press it). Human operators may try multiple ways of achieving the same outcome and/or explore new behaviors. In some implementations, play data can be expected to naturally cover an environment's interaction space in a way expert demonstrations may not.

In some implementations, a goal image dataset may be generated based on teleoperated play data. Segments of the play data stream (e.g., a sequence of image frames) may be selected as an imitation trajectory, where the last image in the selected segment of the data stream is the goal image. In other words, goal images describing the imitation trajectory, in the goal image dataset, can be generated in hindsight, where the goal image is determined based on the sequence of actions, in contrast to generating the sequence of actions based on a goal image. In some implementations, short-horizon goal image training instances can be quickly and/or cheaply generated based on a data stream of teleoperated play data.

In some implementations, a natural language instruction data set may additionally or alternatively based on teleoperated play data. Segments of the play data stream (e.g., a sequence of image frames) may be selected as an imitation trajectory. One or more humans may then describe the imitation trajectory, thus generating a natural language instruction in hindsight (in contrast to generating an imitation trajectory based on a natural language instruction). In some implementations, the natural language instructions collected may cover functional behavior (e.g., "open the drawer", "press the green button", etc.), general non task-specific behaviors (e.g., "move your hand slightly to the left", "do nothing" etc.), and/or additional behaviors. In some implementations, the natural language instructions can be freeform natural language, without constraints placed on the natural language instruction can provide. In some implementations, multiple humans can describe imitation trajectories using free-form natural language which may result in different descriptions of the same object(s), behavior(s), etc. For example, an imitation trajectory may capture a robot picking up a wrench. Multiple human describers can provide different free-form natural language instructions for the imitation trajectory such as "grab the tool", "pick up the wrench", "grasp the object", and/or additional free-form natural language instructions. In some implementations, this diversity in free-form natural language instructions can lead to a more robust goal-conditioned policy network, where wider range of free-form natural language instructions can be implemented by an agent.

A goal-conditioned policy network and corresponding encoders can be trained based on an image goal dataset and a free-form natural language instruction dataset in a variety of ways. For example, a system can process a goal image portion of a goal image training instance using a goal image encoder to generate a latent goal space representation of the goal image. The latent goal space representation of the goal image and an initial frame of the imitation trajectory portion of the goal image training instance to generate goal image candidate output. A goal image loss can be generated based on the goal image candidate output and the goal image imitation trajectory. Similarly, the system can process a natural language instruction portion of a natural language instruction training instance to generate a latent space representation of the natural language instruction. The natural language instruction and the initial frame of the imitation trajectory portion of the natural language instruction training instance can be processed using the goal-conditioned policy network to generate natural language instruction candidate output. A natural language instruction loss can be generated based on the natural language instruction candidate output and the imitation trajectory portion of the natural language instruction training instance. In some implementations, the system can generate a goal-conditioned loss based on the goal image loss and the natural language instruction loss. One or more portions of the goal-conditioned policy network, the goal image encoder, and/or the natural language instruction encoder can be updated based on the goal-conditioned loss. However, this is merely an example of training the goal-conditioned policy network, the goal image encoder, and/or the natural language instruction encoder. Additionally and/or alternative training methods can be used.

In some implementations, the goal-conditioned policy network can be trained using different sized goal image data sets and natural language instruction data sets. For example, the goal-conditioned policy network can be trained based on a first quantity of goal image training instances and a second quantity of natural language instruction training instances, where the second quantity is fifty percent of the first quantity, less than fifty percent of the first quantity, less than ten percent of the first quantity, less than five percent of the first quantity, less than one percent of the first quantity, and/or greater than or less than additional or alternative percentages of the first quantity.

Accordingly, various implementations set forth techniques for learning a shared latent goal space for many task descriptions for use in training a single goal-conditioned policy network. In contrast, conventional techniques train multiple policy networks, one policy network for each task description type. Training a single policy network can allow a wider variety of data to be utilized in training the network. Additionally or alternatively, the policy network can be trained using a larger quantity of training instances of one data type. For example, the goal-conditioned policy network can be trained using hindsight goal image training instances, which can be automatically generated from an imitation learning data stream (e.g., the hindsight goal image training instances are inexpensive to automatically generate when compared natural language instruction training instances which may require human provided natural language instructions). By training the goal-conditioned policy network using both a goal image data set and a natural language instruction data set, where the majority training instances are automatically generated goal image training instances, the resulting goal-conditioned policy network can be robust at generating actions for a robot based on natural language instructions, without requiring the computing resources (e.g., processor cycles, memory, power, etc.) and/or human resources (e.g., the time required for a group of people to provide natural language instructions, etc.) to generate a large natural language instruction data set.

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
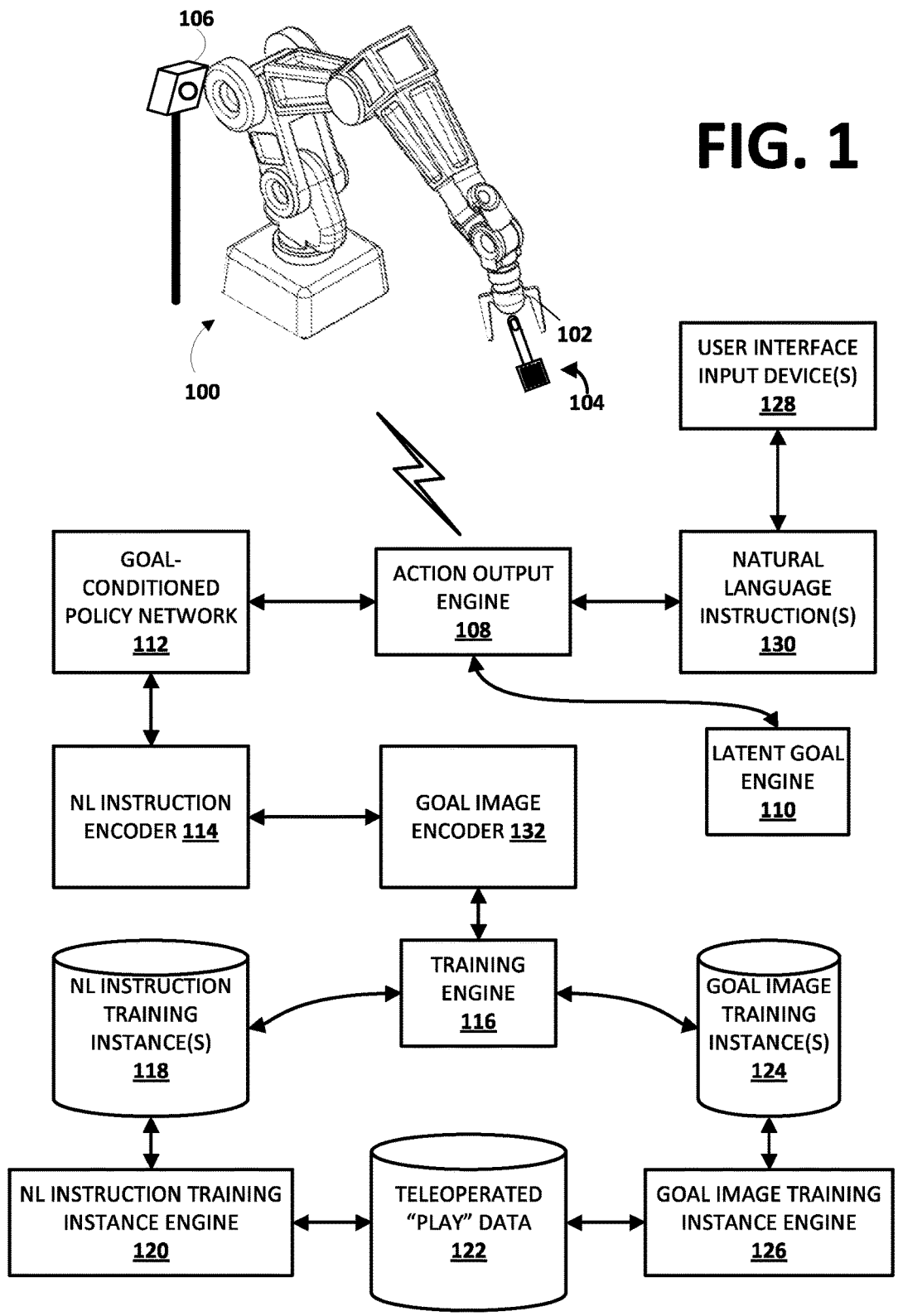
FIG. 1 illustrates an example environment in which implementations described herein may be implemented.

Natural language is a versatile and intuitive way for humans to communicate tasks to a robot. Existing approaches provide for learning a wide variety of robotic behaviors from general sensors. However, each task must be specified with a goal image—something that is not practical in open-world environments. Implementations disclosed herein are directed towards a simple and/or scalable way to condition policies on human language instead. Short robot experiences from play can be paired with relevant human language after-the-fact. To make this efficient, some implementations utilize multi-context imitation, which can allow for the training of a single agent to follow image or language goals, where just language conditioning is used at test time. This can reduce the cost of language pairing to less than a small percentage (e.g., less than 10%, 5%, or 1%) of collected robot experience, with the majority of control still learned via self-supervised imitation. At test time, a single agent trained in this manner can perform many different robotic manipulation skills in a row in a 3D environment, directly from images, and specified only with natural language (e.g. "open the drawer . . . now pick up the block . . . now press the green button . . . "). Additionally, some implementations use a technique that transfers knowledge from large unlabeled text corpora to robotic learning. Transfer can significantly improve downstream robotic manipulation. It also, for example, can allow the agent to follow thousands of novel instructions at test time in zero shot in multiple different languages.

A long-term motivation in robotic learning is the idea of a generalist robot—a single agent that can solve many tasks in everyday settings, using only general onboard sensors. A fundamental but less considered aspect, alongside task and observation space generality, is general task specification: the ability for untrained users to direct agent behavior using the most intuitive and flexible mechanisms. Along these lines, it is hard to imagine a truly generalist robot without also imagining a robot that can follow instructions expressed in natural language.

More broadly, children learn language in the context of a rich, relevant, sensorimotor experience. This motivates the long-standing question in artificial intelligence of embodied language acquisition: how might intelligent agents ground language understanding in their own embodied perception? An ability to relate language to the physical world potentially allows robots and humans to communicate on common ground over shared sensory experience— something that could lead to much more meaningful forms of human-machine interaction.

Furthermore, language acquisition, at least in humans, can be a highly social process. During their earliest interactions, infants contribute actions while caregivers contribute relevant words. While the actual learning mechanism at play in humans is not fully understood, implementations disclosed herein explore what robots can learn from similar paired data.

However, even simple instruction following, can poses a notoriously difficult learning challenge, subsuming many longterm problems in AI. For example, a robot presented with the command "sweep the block into the drawer must be able to relate language to low-level perception (what does a block look like? what is a drawer?). It must perform visual reasoning (what does it mean for the block to be in the drawer?). Additionally, it must solve a complex sequential decision problem (what commands do I send to my arm to "sweep"?). It can be noted these questions cover only a single task, whereas the generalist robot setting demands single agents that perform many tasks.

In some implementations, the setting of open-ended robotic manipulation can be combined with open-ended human language conditioning. Existing techniques typically include restricted observation spaces (e.g. games, 2D gridworlds, simplified actuators, (e.g. binary pick and place primitives, and synthetic language data. Implementations herein are directed towards the combination of 1) human language instructions, 2) high-dimensional continuous sensory inputs and actuators, and/or 3) complex tasks like long-horizon robotic object manipulation. At test time, a single agent that can perform many tasks in a row can be considered in some implementations, where each task can be specified by a human in natural language. For example, "open the door all the way to the right . . . now pick up the block . . . now push the red button . . . now close the door". Furthermore, the agent should be able to perform any combination of subtasks in any order. This can be referred to as the "ask me anything" scenario, which can test aspects of generality, such as general-purpose control, learning from onboard sensors, and/or general task specification.

Existing techniques can provide a starting point for learning general-purpose skills from onboard. However, like other methods that combine relabeling with image observations, existing techniques require that tasks be specified using a goal image to reach. While trivial in a simulator, this form of task specification can be impractical in open-world environments.

In some implementations, the system can extend existing techniques to the natural language setting by:
(1) Cover the space with teleoperated play. In some implementations, the system can collect a teleoperated "play" dataset. These long temporal state-action logs can (automatically) be relabeled into many short-horizon demonstrations, solving for image goals.
(2) Pair play with human language. Existing techniques typically pair instructions with optimal behavior. In contrast, in some implementations described herein, behavior from play can be paired after-the-fact with optimal instructions (i.e., Hindsight Instruction Pairing). This can yield a dataset of demonstrations, solving for human language goals.
(3) Multicontext imitation learning. In some implementations, a single policy can be trained to solve image and/or language goals. Additionally or alternatively, in some implementations, only language conditioning is used at test time. To make this possible, the system can utilize Multicontext Imitation Learning. Multicontext imitation learning can be highly data efficient. It reduces the cost of language pairing, for example, to less than a small percentage (e.g., less than 10%, less than 5%, less than 1%) of collected robot experience to enable language conditioning, with the majority of control still learned via self-supervised imitation.
(4) Condition on human language at test time. In some implementations, at test time, a single policy trained in this manner can perform many complex robotic manipulation skills in a row, directly from images, and specified entirely with natural language.

Additionally or alternatively, some implementations include transfer learning from unlabeled text corpora to robotic manipulation. A transfer learning augmentation can be used, which can be applicable to any language conditioned policy. In some implementations, this can improve downstream robotic manipulation. Importantly, this technique can allow the agent to follow of novel instructions in zero shot (e.g., follow thousands of novel instructions, and/or follow instructions across multiple languages).Goal conditioned learning can be used to train a single agent to reach any goal. This can be formalized as a goal conditioned policy $\pi_\theta(a|s, g)$, which outputs next action $a \in A$, conditioned on current state $s \in S$ and a task descriptor $g \in G$. Imitation approaches can learn this mapping using supervised learning over a dataset $$D = \{(\tau, g)_i\}_i^N,$$

of expert state-action trajectories $\tau=\{(s_0, \alpha_0), \ldots\}$ solving for a paired task descriptor (such as a one-hot task encoding). A convenient choice for a task descriptor can be some goal state $g=s_g \in S$. This can allow any state visited during collection to be relabeled as a "reached goal state", with the preceding states and actions treated as optimal behavior for reaching that goal. Applied to some original dataset D, this can yield a much larger dataset of relabeled examples $$D_R = \{(\tau, s_g)_i\}_i^{N_R}, N_R \gg N,$$

providing the inputs to a simple maximum likelihood objective for goal directed control: relabeled goal conditioned behavioral cloning (GCBC):

$$\mathcal{L}_{GCBC} = \mathbb{E}_{(\tau, s_g) \sim D_R}\left[\sum_{t=0}^{|\tau|} \log \pi_\theta(a_t|s_t, s_g)\right] \quad (1)$$

While relabeling can automatically generate a large number of goal-directed demonstrations at training time, it may not account for the diversity of those demonstrations, which may come entirely from the underlying data. To be able to reach any user-provided goal motivates data collection methods, upstream of relabeling, that fully cover state space.

Human teleoperated "play" collection can directly addresses the state space coverage problem. In this setting, an operator may no longer be constrained to a set of predefined tasks, but rather can engage in every available object manipulation in a scene. The motivation is to fully cover state space using prior human knowledge of object affordances. During collection, the stream of onboard robot observations and actions are recorded, $$\{(s_t, a_t)\}_{t=0}^\infty,$$

yielding an unsegmented dataset of unstructured but semantically meaningful behaviors, which can be useful in a relabeled imitation learning context.

Learning from play can combine relabeled imitation learning with teleoperated play. First, unsegmented play logs are relabeled using Algorithm 2. This can yield a training set $$D_{play} = \{(\tau, s_g)_i\}_{i=0}^{D_{play}},$$

holding many diverse, short-horizon examples. In some implementations, these can be fed to a standard maximum likelihood goal conditioned imitation objective:

$$\mathcal{L}_{LfP} = \mathbb{E}_{(\tau, s_g) \sim D_{play}}\left[\sum_{t=0}^{|\tau|} \log \pi_\theta(a_t|s_t, s_g)\right] \quad (2)$$

A limitation of learning from play—and other approaches that combine relabeling with image state spaces—is that behavior must be conditioned on a goal image $s_g$ at test time. Some implementations described herein can focus on a more flexible mode of conditioning: humans describing tasks in natural language. Succeeding at this may require solving a complicated grounding problem. To address this, Hindsight Instruction Pairing, a method for pairing large amounts of diverse robot sensor data with relevant human language, can be used. In some implementations, to leverage both image goal and language goal datasets, Multicontext Imitation Learning can be used. Additionally or alternatively, language learning from play (LangLfP) can be used, which ties together these components to learn a single policy that follows many human instructions over a long horizon.

From a statistical machine learning perspective, a candidate for grounding human language in robot sensor data is a large corpora of robot sensor data paired with relevant language. One way to collect this data is to choose an instruction, then collect optimal behavior. Additionally or alternatively, some implementations can sample any robot behavior from play, then collect an optimal instruction, which can be referred to as Hindsight Instruction Pairing (Algorithm 3). Much like how a hindsight goal image is an after-the-fact answer to the question "which goal state makes this trajectory optimal?", a hindsight instruction is an after-the-fact answer to the question "which language instruction makes this trajectory optimal?". In some implementations, these pairs can be obtained by showing humans onboard robot sensor videos, then asking them "what instruction would you give the agent to get from first frame to last frame"?

The hindsight instruction pairing process can assume access to $D_{play}$, which can be obtained using Algorithm 2, and a pool of non-expert human overseers. From $D_{play}$, a new dataset $$D_{(play,lang)} = \{(\tau, l)_i\}_{i=0}^{D_{(play,lang)}}$$

can be created, which consists of short-horizon play sequences x paired with $l \in L$ a human-provided hindsight instruction with no restrictions on vocabulary and/or grammar.

In some implementations, this process can be scalable because pairing happens after-the-fact, making it straightforward to parallelize (e.g., via crowdsourcing). The language collected may also be naturally rich, as it sits on top of play and is similarly not constrained by an upfront task definition. This can result in instructions for functional behavior (e.g. "open the drawer", "press the green button"), as well as general non task-specific behavior (e.g. "move your hand slightly to the left." or "do nothing."). In some implementations, it may be unnecessary to pair every experience from play with language to learn to follow instructions. This can be made possible with Multicontext Imitation Learning, described herein.

So far, a way to create two contextual imitation datasets has been described: $D_{play}$ holding hindsight goal image examples and $D_{(play,lang)}$, holding hindsight instruction examples. In some implementations, a single policy can be trained that is agnostic to either task description. This can allow the sharing of statistical strength over multiple datasets during training, and/or can allow the use of just language specification at test time.

With this motivation, some implementations use multicontext imitation learning (MCIL), a simple and/or widely applicable generalization of contextual imitation to multiple heterogeneous contexts. The main idea is to represent a large set of policies by a single, unified function approximator that can generalize over states, tasks, and/or task descriptions.

MCIL can assume access to multiple imitation learning datasets D={$D^0, \ldots, D^k$}, each with a different way of describing tasks. In some implementations, each $$D^k = \{(\tau_i^k, c_i^k)\}_{i=0}^{D^k}$$

holds pairs of state-action trajectories τ paired with some context c ∈ C. For example, $D^0$ might contain demonstrations paired with one-hot task ids (a conventional multitask imitation learning dataset), $D^1$ might contain image goal demonstrations, and $D^2$ might contain language goal demonstrations.

Rather than train one policy per dataset, MCIL instead trains a single latent goal conditioned policy $\pi_\theta * \alpha_t | s_t, z)$ over all datasets simultaneously, learning to map each task description type to the same latent goal space $z \in \mathbb{R}^d$. This latent space can be seen as a common abstract goal representation shared across many imitation learning problems. To make this possible, MCIL can assume a set of parameterized encoders $$\mathcal{F} = \{f_\theta^0, \ldots f_\theta^K\},$$

one per dataset, each responsible for mapping task descriptions of a particular type to the common latent goal space, i.e.

$$z = f_\theta^k(c^k).$$

For instance, these could be a task id embedding lookup, an image encoder, a language encoder respectively, one or more additional or alternative values, and/or combinations thereof.

In some implementations, MCIL has a simple training procedure: At each training step, for each dataset $D^k$ in D, sample a minibatch of trajectory-context pairs $(\tau^k, c^k) \sim D^k$, encode the contexts in latent goal space $$z = f_\theta^k(c^k),$$

then compute a simple maximum likelihood contextual imitation objective:

$$\mathcal{L}_{context} = \mathbb{E}_{(\tau,c)\sim D}\left[\sum_{t=0}^{|\tau|} \log \pi_\theta(a_t|s_t, f_\theta(c))\right] \quad (3)$$

The full MCIL objective can average this per-dataset objective over all datasets at each training step, $$\mathcal{L}_{MCIL} = \frac{1}{|D|}\sum_k^{|D|} \mathcal{L}_{context}(D_k, h_k) \quad (4)$$

and the policy and all goal encoders are trained end to end to maximize $\mathbb{R}_{MCIL}$. See Algorithm 1 for full minibatch training pseudocode.

In some implementations, multicontext learning has properties that can make it broadly useful beyond learning from play. While the dataset D can be set to D={$D_{play}, D_{(play,lang)}$} herein, this approach can be used more generally for training over any set of imitation datasets with different descriptions—e.g. task id, language, human video demonstration, speech, etc. Being context-agnostic can enable a highly efficient training scheme: learn the majority of control from the cheapest data source, while learning the most general form of task conditioning from a small number of labeled examples. In this way, multicontext learning can be interpreted as transfer learning through a shared goal space. This can reduce the cost of human oversight to the point where it can be practically applied. Multicontext learning can allow the training of an agent to follow human instructions with a small percentage (e.g., less than 10%, less than 5%, less than 1%, etc.) of collected robot experience requiring paired language, with the majority of control learned instead from relabeled goal image data.

In some implementations, language conditioned learning from play (LangLfP) is a special case of multicontext imitation learning. At a high level, LangLfP trains a single multicontext policy $\pi_\theta(\alpha_t|s_t, z)$ over datasets D={$D_{play}, D_{(play,lang)}$}, consisting of hindsight goal image tasks and hindsight instruction tasks. In some implementations, $\mathcal{F} = \{g_{enx}, s_{enc}\}$ can be a neural network encoders mapping from image goals and instructions respectively to the same latent visuo-lingual goal space. LangLfP can learn perception, natural language understanding, and control end-to-end with no auxiliary losses.

Perception module. In some implementations, τ in each example consists of $$\{(O_t, a_t)\}_t^{|\tau|},$$

a sequence of onboard observations $O_t$ and actions. Each observation can contain a high-dimensional image and/or an internal proprioceptive sensor reading. A learned perception module $P_\theta$ maps each observation tuple to a low-dimensional embedding, e.g., $s_t=P_\theta(O_t)$, fed to the rest of the network. This perception module can be shared with $g_{enc}$, which defines an additional network on top to map encoded goal observation $s_g$ to a point in z space.

Language module. In some implementations, the language goal encoder $s_{enc}$ tokenizes raw text l into subwords, retrieves subword embeddings from a lookup table, and/or then summarizes embeddings into a point in z space. Subword embeddings can be randomly initialized at the beginning of training and learned end-to-end by the final imitation loss.

Control module. Many architectures can be used to implement the multicontext policy $\pi_\theta(\alpha_t|s_t, z)$. For example, Latent Motor Plans (LMP) can be used. LMP is a goal-directed imitation architecture that uses latent variables to model the large amount of multimodality inherent to free-form imitation datasets. Concretely, it can be a sequence-to-sequence conditional variational autoencoder (seq2seq CVAE) autoencoding contextual demonstrations through a latent "plan" space. The decoder is a goal conditioned policy. As a CVAE, LMP lower bounds maximum likelihood contextual imitation, and can be easily adapted to the multicontext setting.

LangLfP training. LangLfP training can be compared with existing LfP training. At each training step, a batch of image goal tasks can be sampled from $D_{play}$, and a batch of language goal tasks can be sampled from $D_{(play,lang)}$. Observations are encoded into the state space using the perception module $P_\theta$. Image and language goals can be encoded into latent goal space z using encoders $g_{enc}$ and $s_{enc}$. The policy $\pi_\theta(\alpha_t|s_t, z)$ can be used to compute the multicontext imitation objective, averaged over both task descriptions. In some implementations, a combined gradient step can be taken with respect to all modules—perception, language, and control—optimizing the whole architecture end-to-end as a single neural network.

Following human instructions at test time. At the beginning of a test episode the agent receives as input its onboard observation $O_t$ and a human-specified natural language goal l. The agent encodes l in latent goal space z using the trained sentence encoder $s_{enc}$. The agent then solves for the goal in closed loop, repeatedly feeding the current observation and goal to the learned policy $\pi_\theta(\alpha_t|s_t, z)$, sampling actions, and executing them in the environment. The human operator can type a new language goal l at any time.

Large "in the wild" natural language corpora can reflect substantial human knowledge about the world. Many recent works have successfully transferred this knowledge to downstream tasks in NLP via pretrained embeddings. In some implementations described herein, similar knowledge transfer can be achieved to robotic manipulation?

There are many benefits to this type of transfer. First, if there is a semantic match between the source corpora and the target environment, more structured inputs may act as a strong prior, shaping grounding or control, Additionally or alternatively, language embeddings have been shown to encode similarity between large numbers of words and sentences. This may allow an agent to follow many novel instructions in zero shot, provided they are sufficiently "close" to ones it has been trained to follow. Note, given the complexity of natural language, it may be likely that robots in open-world environments will need to be able to follow synonym commands outside of a particular training set.

---

Algorithm 1 Multicontext imitation learning

---

Input: $D = \{D^0, \ldots, D^K\}$, $D^k = \{(\tau_i^k, c_i^k)\}_{i=0}^{D^k}$, One dataset per context type (e.g. goal image, language instruction, task id), each holding pairs of (demonstration, context).

Input: $\mathcal{F} = \{f_\theta^0, \ldots, f_\theta^K\}$, One encoder per context type, mapping context to shared latent goal space, e.g. $z = f_\theta^k(c^k)$.

]Input: $\pi_\theta(a_t|s_t, z)$, Single latent goal conditioned policy.
]Input: Randomly initialize parameters $\theta = \{\theta_\pi, \theta_f^0, \ldots, \theta_f^K\}$
]while True do
   $\mathcal{L}_{MCIL} \leftarrow 0$
  ]# Loop over datasets.
  ]for k = 0 . . . K do
    ]# Sample a (demonstration, context) batch from this dataset.

]$(\tau^k, c^k) \sim D^k$

]# Encode context in shared latent goal space.

]$z = f_\theta^k(c^k)$

]# Accumulate imitation loss.

$\mathcal{L}_{MCIL} \mathrel{+}= \sum_{t=0}^{|\tau^k|} \log \pi_\theta(a_t|s_t, z)$ ]end for
  ]# Average gradients over context types.

---

Algorithm 1 Multicontext imitation learning

---

$\mathcal{L}_{MCIL} \mathrel{*}= \frac{1}{|D|}$

]
  # Train policy and all encoders end-to-end.
  Update $\theta$ by taking a gradient step w.r.t. $\mathcal{L}_{MCIL}$
end while

---

Algorithm 2 Creating millions of goal image conditioned imitation examples from teleoperated play.

---

Input: $S = \{(s_{0:t}, a_{0:t})^n\}_n^\infty$, the unsegmented stream of observations and actions recorded during play.
  Input: $D_{play} \leftarrow \{\ \}$.
  Input: $w_{low}$, $w_{high}$, bounds on hindsight window size.
  while True do
    # Get next play episode from stream.
    $(s_{0:t}, a_{0:t}) \sim S$
    for w = $w_{low}$ . . . $w_{high}$ do
      for i = 0.. (t − w) do
        # Select each w-sized window.
        $\tau = (s_{i:i+w}, a_{i:i+w})$
        # Treat last observation in window as goal.
        $s_g = s_w$
        Add ($\tau$, $s_g$) to $D_{play}$
      end for
    end for
  end while

---

Algorithm 3 Pairing robot sensor data with natural language instructions.

---

Input: $D_{play}$, a relabeled play dataset holding ($\tau$, $s_g$) pairs.
Input: $D_{(play,lang)} \leftarrow \{\ \}$.
Input: get_hindsight_instruction( ): human overseer, providing after-the-fact natural language instructions for a given $\tau$.
Input: K, number of pairs to generate, K << $|D_{play}|$.
for 0 . . . K do
  # Sample random trajectory from play.
  ($\tau$, ) $\sim D_{play}$
  # Ask human for instruction making $\tau$ optimal
  l = get$_{hindsight_{instruction}(\tau)}$
  Add ($\tau$, l) to $D_{(play,lang)}$
end for

---

Turning now to the figures, example robot 100 is illustrated in FIG. 1. Robot 100 is a "robot arm" having multiple degrees of freedom to enable traversal of grasping end effector 102 along any of a plurality of potential paths to position the grasping end effector 102 in a desired location. Robot 100 further controls the two opposed "claws" of its grasping end effector 102 to actuate the claws between at least an open position and a closed position (and/or optionally a plurality of "partially closed" positions).

Example vision component 106 is also illustrated in FIG. 1. In FIG. 1, vision component 106 is mounted at a fixed pose relative to the base or other stationary reference point of robot 100. Vision component 106 includes one or more sensors that can generate images and/or other vision data related to shape, color, depth, and/or other features of object(s) that are in the line of sight of the sensors. The vision component 106 may be, for example, a monographic camera, a stereographic camera, and/or a 3D laser scanner. A 3D laser scanner may be, for example, a time-of-flight 3D laser scanner or a triangulation based 3D laser scanner and may include a position sensitive detector (PDS) or other optical position sensor.

The vision component 106 has a field of view of at least a portion of the workspace of the robot 100, such as the portion of the workspace that includes example object 104. Although resting surface(s) for object 104 is not illustrated in FIG. 1, those objects may rest on a table, a tray, and/or other surface(s). Objects 104 may include a spatula, a stapler, and a pencil. In other implementations, more objects, fewer objects, additional objects, and/or alternative objects may be provided during all or portions of grasp attempts of robot 100 as described herein.

Although a particular robots 100 is illustrated in FIG. 1, additional and/or alternative robots may be utilized, including additional robot arms that are similar to robot 100, robots having other robot arm forms, robots having a humanoid form, robots having an animal form, robots that move via one or more wheels (e.g., self-balancing robots), submersible vehicle robots, an unmanned aerial vehicle ("UAV"), and so forth. Also, although particular grasping end effectors are illustrated in FIG. 1, additional and/or alternative end effects may be utilized, such as alternative impactive grasping end effectors (e.g., those with grasping "plates", those with more or fewer "digits"/"claws"), ingressive grasping end effectors, astrictive grasping end effectors, contigutive grasping end effectors, or non-grasping end effectors. Additionally, although a particular mountings of vision component 106 is illustrated in FIG. 1, additional and/or alternative mountings may be utilized. For example, in some implementations, vision components may be mounted directly to robots, such as on non-actuable components of the robots or on actuable components of the robots (e.g., one the end effector or on a component close to the end effector). Also, for example, in some implementations, a vision component may be mounted on a non-stationary structure that is separate from its associated robot and/or may be mounted in a non-stationary manner on a structure that is separate from its associated robot.

Data from robot 100 (e.g., vision data captured using vision component 106), along with natural language instruction(s) 130, captured using user interface input device(s) 128, can be utilized by action output engine 108, to generate action output. In some implementations, robot 100 can be controlled (e.g., one or more actuators of robot 100 can be controlled) to perform one or more actions based on the action output. In some implementations, user interface input device(s) 128 may include, for example, a physical keyboard, a touch screen (e.g., implementing a virtual keyboard or other textual input mechanisms), a microphone, and/or a camera. In some implementations, the natural language instruction(s) 130 can be free-form natural language instruction(s).

In some implementations, latent goal engine 110 can process natural language instruction 130, using natural language instruction encoder 114, to generate a latent state representation of the natural language instruction. For example, a keyboard user interface input device 128 can capture a natural language instruction of "push the green button". Latent goal engine 110 can process the natural language instruction 130 of "push the green button", using natural language instruction encoder 114, to generate a latent goal representation of "push the green button".

In some implementations, goal image training instance engine 126 can be used to generate goal image training instance(s) 124 based on teleoperated "play" data 122. Teleoperated "play" data 122 can be generated by a human controlling a robot in an environment, where the human controller does not have defined tasks to perform. In some implementations, each goal image training instance 124 can include an imitation trajectory portion and a goal image portion, where the goal image portion describes the task a robot task. For example, a goal image can be an image of a closed drawer, which can describe robot action(s) of closing the drawer. As another example, a goal image can be an image of an open drawer, which can describe robot action(s) of opening the door. In some implementations, goal image training instance engine 126 can select a sequence of image frames from a teleoperated play data stream. Goal image training instance engine 126 can generate one or more goal instance training instances by storing the selected sequence of image frames as the imitation trajectory portion of a training instance, and storing the last image frame of the sequence of image frames as the goal image portion of the training instance. In some implementations, goal image training instance(s) 124 can be generated in accordance with process 400 of FIG. 4 described herein.

In some implementations, natural language instruction training instance engine 120 can be used to generate natural language training instance(s) 118 using teleoperated play data 122. Natural language instruction training instance engine 120 can select a sequence of image frames from a data stream of teleoperated play data 122. In some implementations, a human describer can provide a natural language instruction describing the task being performed by the robot in the selected sequence of image frames. In some implementations, multiple human describers can provide natural language instructions describing the task being performed by the robot in the same selected sequence of image frames. Additionally or alternatively, multiple human describers can provide natural language instructions describe the task being performed in distinct sequences of images frames. In some implementations, multiple human describers can provide natural language instructions in parallel. Natural language instruction training instance engine 120 can generate one or more natural language instruction training instances by storing the selected sequence of image frames as an imitation trajectory portion of a training instance, and storing the human provided natural language instruction as the natural language instruction portion of the training instance. In some implementations, natural language training instance(s) 124 can be generated in accordance with process 500 of FIG. 5 described herein.

In some implementations, training engine 116 can be used to train goal-conditioned policy network 112, natural language instruction encoder 114, and/or goal image encoder 132. In some implementations, goal-conditioned policy network 112, natural language instruction encoder 114, and/or goal image encoder 132 can be trained accordance with process 600 of FIG. 6 described herein.

Figure 2:
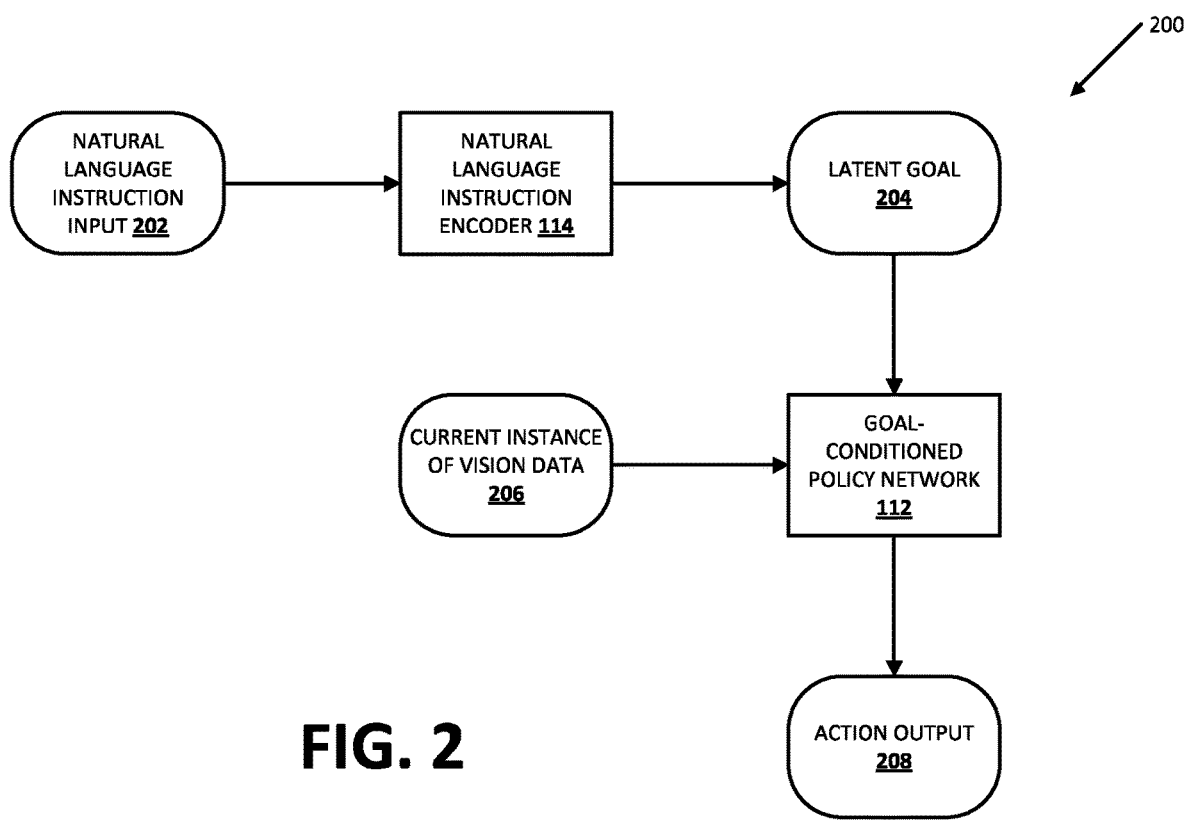
FIG. 2 illustrates an example of generating action output, using a goal-conditioned policy network, in accordance with various implementations described herein.

FIG. 2 illustrates an example of generating action output 208 in accordance with a variety of implementations. Example 200 includes receiving natural language instruction input 202 (e.g., receiving natural language instruction input via one or more user interface input devices 128 of FIG. 1). In some implementations, natural language instruction input 202 can be free-form natural language input. In some implementations, natural language instruction input 202 can be text natural language input. Natural language instruction encoder 114 can process natural language instruction input 202 to generate a latent goal space representation of the natural language instruction 204. Goal-conditioned policy network 112 can be used to process latent goal 204 along with a current instance of vision data 206 (e.g., an instance of vision data captured via vision component 106 of FIG. 1), to generate action output 208. In some implementations, action output 208 can describe one or more actions for a robot to perform to perform the tasks instructed by natural language instruction input 202. In some implementations, one or more actuators of a robot (e.g., robot 100 of FIG. 1) can be controlled based on action output 208 for the robot to perform the task indicated by the natural language instruction input 202.

Figure 3:
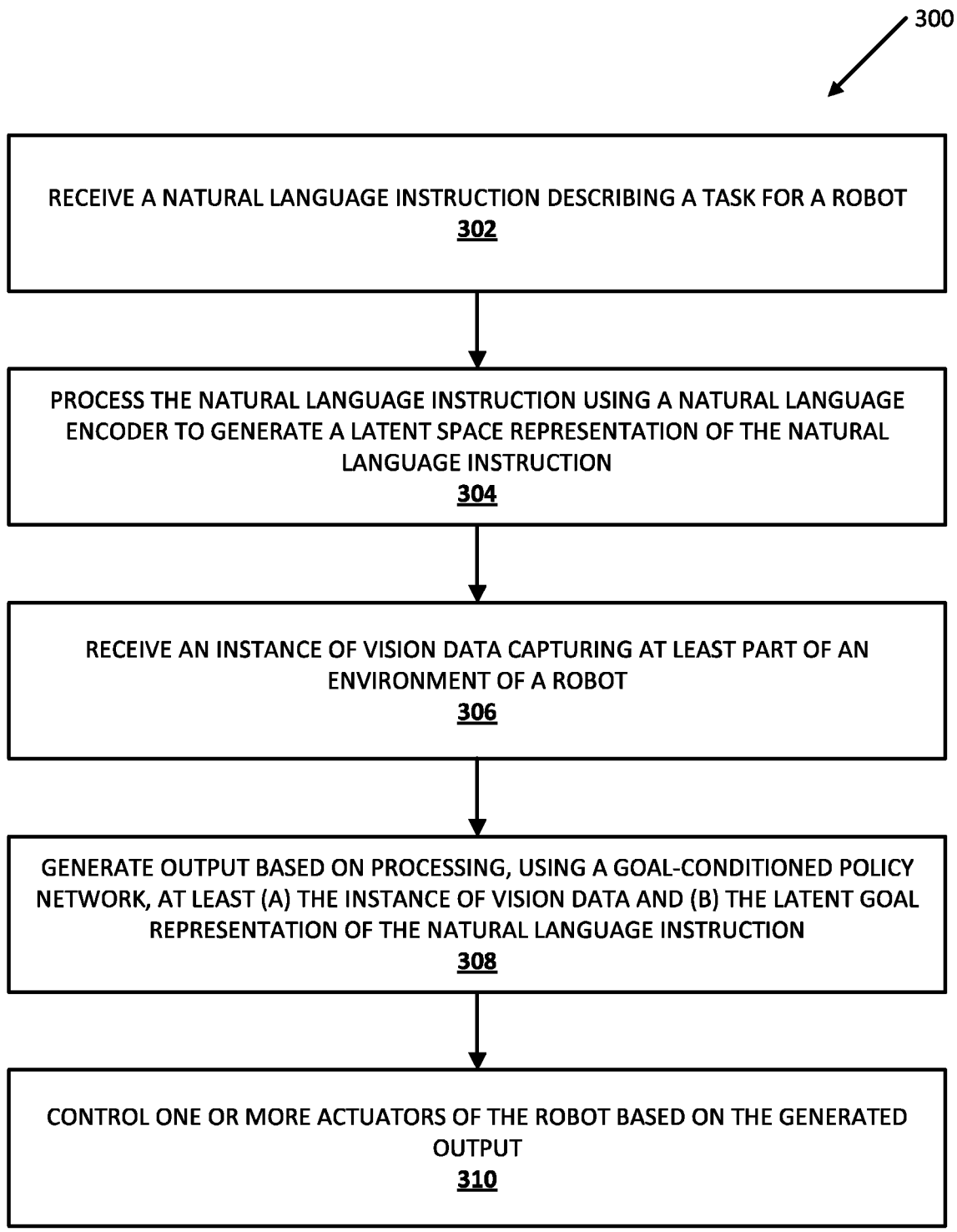
FIG. 3 is a flowchart illustrating an example process of controlling a robot based on a natural language instruction in accordance with various implementations disclosed herein.

FIG. 3 is a flowchart illustrating a process 300 of generating output, using a goal-conditioned policy network in controlling a robot, based on a natural language instruction, in accordance with implementations disclosed herein. For convenience, the operations of the flowchart are described with reference to a system that performs the operations. This system may include various components of various computer systems, such as one or more components of robot 100, robot 725, and/or computing system 810. Moreover, while operations of process 300 are shown in a particular order, this is not meant to be limiting. One or more operations may be reordered, omitted, and/or added.

At block 302, the system receives a natural language instruction describing a task for a robot. For example, the system can receive a natural language instruction of "push the red button", "close the door", "pick up the screwdriver", and/or additional or alternative natural language instructions describing a task to be performed by a robot.

At block 304, the system processes the natural language instruction using a natural language encoder to generate a latent space representation of the natural language instruction.

At block 306, the system receives an instance of vision data capturing a least part of an environment of a robot.

At block 308, the system generates output based on processing, using a goal-conditioned policy network, at least (a) the instance of vision data and (b) the latent goal representation of the natural language instruction.

At block 310, the system controls one or more actuators of the robot based on the generated output.

Process 300 of FIG. 3 is described with respect to controlling a robot based on natural language instructions. In additional or alternative implementations, the system can control a robot based on goal images, task IDs, speech, etc. in place of the natural language instructions or in addition to the natural language instructions. For example, a system can control a robot based on natural language instructions and goal image instructions, where the natural language instructions are processed using a corresponding natural language instruction encoder and the goal images are processed using a corresponding goal image encoder.

Figure 4:
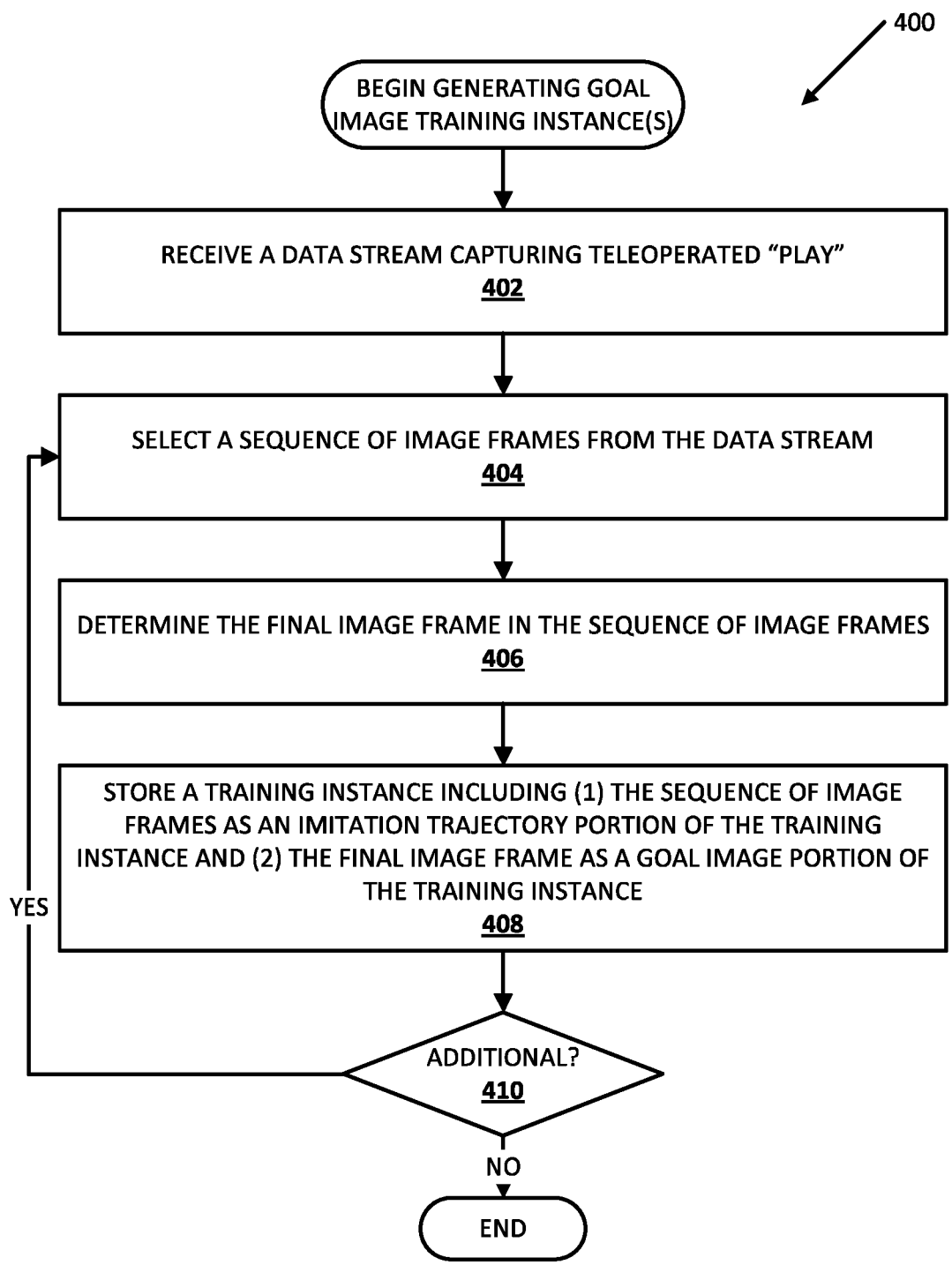
FIG. 4 is a flowchart illustrating an example process of generating goal image training instance(s) in accordance with various implementations disclosed herein.

FIG. 4 is a flowchart illustrating a process 400 of generating goal image training instance(s) in accordance with implementations disclosed herein. For convenience, the operations of the flowchart are described with reference to a system that performs the operations. This system may include various components of various computer systems, such as one or more components of robot 100, robot 725, and/or computing system 810. Moreover, while operations of process 400 are shown in a particular order, this is not meant to be limiting. One or more operations may be reordered, omitted, and/or added.

At block 402, the system receives a data stream capturing teleoperated play data.

At block 404, the system selects a sequence of image frames from the data stream. For example, the system can select a one second sequence of image frames in the data stream, a two second sequence of image frames in the data stream, a ten second sequence of image frames in the data stream, and/or additional or alternative lengths of segments of image frames in the data stream.

At block 404, the system determines the final image frame in the selected sequence of image frames.

At block 406, the system stores a training instance including (1) the sequence of image frames as an imitation trajectory portion of the training instance and (2) the final image frame as a goal image portion of the training instance. In other words, the system stores the final image as the goal image describing the task captured in the sequence of image frames.

At block 410, the system determines whether to generate an additional training instance. In some implementations, the system can determine to generate additional training instances until one or more conditions are satisfied. For example, the system can continue to generate training instances until a threshold number of training instances are generated, until the entire data stream has been processed, and/or until additional or alternative conditions have been satisfied. If the system determines to generate an additional training instance, the system proceeds back to block 404, selects an additional sequence of image frames from the data stream, and performs an additional iteration of block 406 and 408 based on the additional sequence of image frames. If not, the process ends.

Figure 5:
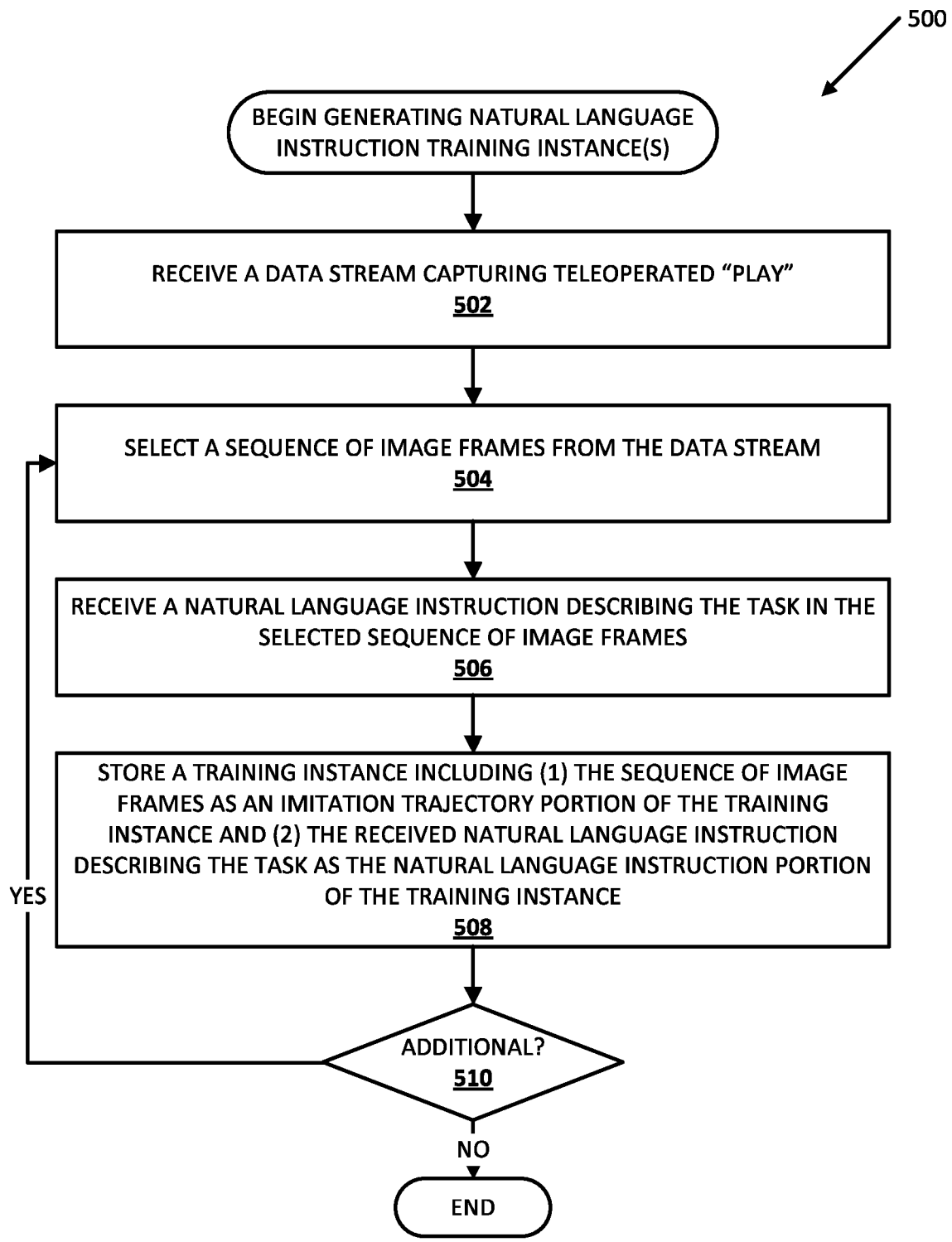
FIG. 5 is a flowchart illustrating an example process of generating natural language instruction training instance(s) in accordance with various implementations disclosed herein.

FIG. 5 is a flowchart illustrating a process 500 of generating natural language instruction training instance(s) in accordance with implementations disclosed herein. For convenience, the operations of the flowchart are described with reference to a system that performs the operations. This system may include various components of various computer systems, such as one or more components of robot 100, robot 725, and/or computing system 810. Moreover, while operations of process 500 are shown in a particular order, this is not meant to be limiting. One or more operations may be reordered, omitted, and/or added.

At block 502, the system receives a data stream capturing teleoperated play data.

At block 504, the system selects a sequence of image frames from the data stream. For example, the system can select a one second sequence of image frames in the data stream, a two second sequence of image frames in the data stream, a ten second sequence of image frames in the data stream, and/or additional or alternative lengths of segments of image frames in the data stream.

At block 506, the system receives a natural language instruction describing the task in the selected sequence of image frames.

At block 508, the system stores a training instance including (1) the sequence of image frames as an imitation trajectory portion of the training instance and (2) the received natural language instruction describing the task as the natural language instruction portion of the training instance.

At block 510, the system determines whether to generate an additional training instance. In some implementations, the system can determine to generate additional training instances until one or more conditions are satisfied. For example, the system can continue to generate training instances until a threshold number of training instances are generated, until the entire data stream has been processed, and/or until additional or alternative conditions have been satisfied. If the system determines to generate an additional training instance, the system proceeds back to block 504, selects an additional sequence of image frames from the data stream, and performs an additional iteration of block 506 and 508 based on the additional sequence of image frames. If not, the process ends.

Figure 6:
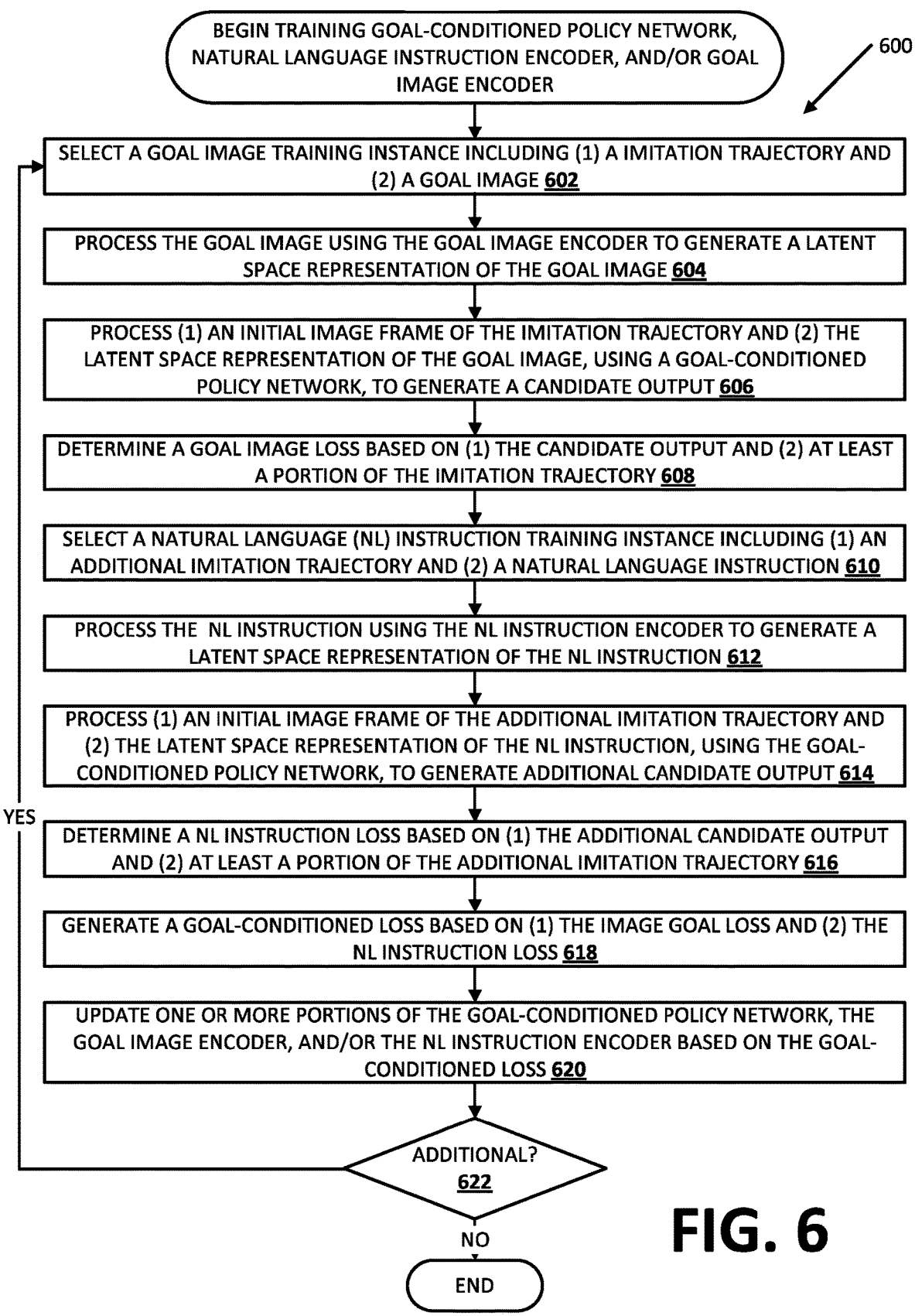
FIG. 6 is a flowchart illustrating an example process of training a goal-conditioned policy network, a natural language instruction encoder, and/or a goal image encoder in accordance with various implementations disclosed herein.

FIG. 6 is a flowchart illustrating a process 600 of training a goal-conditioned policy network, a natural language instruction encoder, and/or a goal image encoder in accordance with implementations disclosed herein. For convenience, the operations of the flowchart are described with reference to a system that performs the operations. This system may include various components of various computer systems, such as one or more components of robot 100, robot 725, and/or computing system 810. Moreover, while operations of process 600 are shown in a particular order, this is not meant to be limiting. One or more operations may be reordered, omitted, and/or added.

At block 602, the system selects a goal image training instance including (1) an imitation trajectory and (2) a goal image.

At block 604, the system processes the goal image using a goal image encoder to generate a latent goal space representation of the goal image.

At block 606, the system processes at least (1) an initial image frame of the imitation trajectory and (2) the latent space representation of the goal image, using a goal-conditioned policy network, to generate candidate output.

At block 608, the system determines a goal image loss based on (1) the candidate output and (2) at least a portion of the imitation trajectory.

At block 610, the system selects a natural language instruction training instance including (1) an additional imitation trajectory and (2) a natural language instruction.

At block 612, the system processes the natural language instruction portion of the natural language instruction training instance using a natural language encoder to generate a latent space representation of the natural language instruction.

At block 614, the system processes (1) an initial image frame of the additional imitation trajectory and (2) the latent space representation of the natural language instruction, using the goal-conditioned policy network, to generate additional candidate output.

At block 616, the system determines a natural language loss based on (1) the additional candidate output and (2) at least a portion of the additional imitation trajectory.

At block 618, the system generates a goal-conditioned loss based on (1) the image goal loss and (2) the natural language instruction loss.

At block 620, the system updates one or more portions of the goal-conditioned policy network, the goal image encoder, and/or the natural language instruction encoder based on the goal-conditioned loss.

At block 622, the system determines whether to perform additional training on the goal-conditioned policy network, the goal image encoder, and/or the natural language instruction encoder. In some implementation, the system can determine to perform more training if there are one or more additional unprocessed training instances and/or if other criterion/criteria are not yet satisfied. The other criterion/criteria can include, for example, whether a threshold number of epochs have occurred and/or a threshold duration of training has occurred. Process 600 may be trained utilizing both non-batch learning techniques, batch learning techniques and/or additional or alternative techniques. If the system determines to perform additional training, the system proceeds back to block 602, selects an additional goal image training instance, performs an additional iteration of blocks 604, 606, and 608 based on the additional goal image training instance, selects an additional natural language instruction training instance at block 610, perform an additional iteration of blocks 612, 614, and 616 based on the additional natural language instruction training instance, and perform an additional iteration of blocks 618 and 610 based on the additional goal image training instance and the additional natural language instruction training instance. If not, the process ends.

Figure 7:
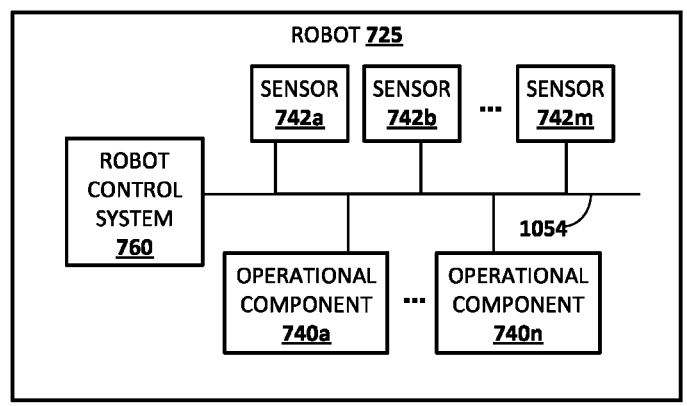
FIG. 7 schematically depicts an example architecture of a robot.

FIG. 7 schematically depicts an example architecture of a robot 725. The robot 725 includes a robot control system 760, one or more operational components 740*a*-740*n*, and one or more sensors 742*a*-742*m*. The sensors 742*a*-742*m* may include, for example, vision components, light sensors, pressure sensors, pressure wave sensors (e.g., microphones), proximity sensors, accelerometers, gyroscopes, thermometers, barometers, and so forth. While sensors 742*a*-*m* are depicted as being integral with robot 725, this is not meant to be limiting. In some implementations, sensors 742*a*-*m* may be located external to robot 725, e.g., as standalone units.

Operational components 740*a*-740*n* may include, for example, one or more end effectors and/or one or more servo motors or other actuators to effectuate movement of one or more components of the robot. For example, the robot 725 may have multiple degrees of freedom and each of the actuators may control actuation of the robot 725 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 760 may be implemented in one or more processors, such as a CPU, GPU, and/or other controller(s) of the robot 725. In some implementations, the robot 725 may comprise a "brain box" that may include all or aspects of the control system 760. For example, the brain box may provide real time bursts of data to the operational components 740*a*-*n*, with each of the real time bursts comprising a set of one or more control commands that dictate, inter alio, the parameters of motion (if any) for each of one or more of the operational components 740*a*-*n*. In some implementations, the robot control system 760 may perform one or more aspects of processes 300, 400, 500, 600, and/or other method(s) described herein.

As described herein, in some implementations all or aspects of the control commands generated by control system 760 in positioning an end effector to grasp an object may be based on end effector commands generated using a goal-conditioned policy network. For example, a vision component of the sensors 742*a*-*m* may capture environment state data. This environment state data may be processes, along with robot state data, using a policy network of the meta-learning model to generate the one or more end effector control commands for controlling the movement and/or grasping of an end effector of the robot. Although control system 760 is illustrated in FIG. 7 as an integral part of the robot 725, in some implementations, all or aspects of the control system 760 may be implemented in a component that is separate from, but in communication with, robot 725. For example, all or aspects of control system 760 may be implemented on one or more computing devices that are in wired and/or wireless communication with the robot 725, such as computing device 810.

Figure 8:
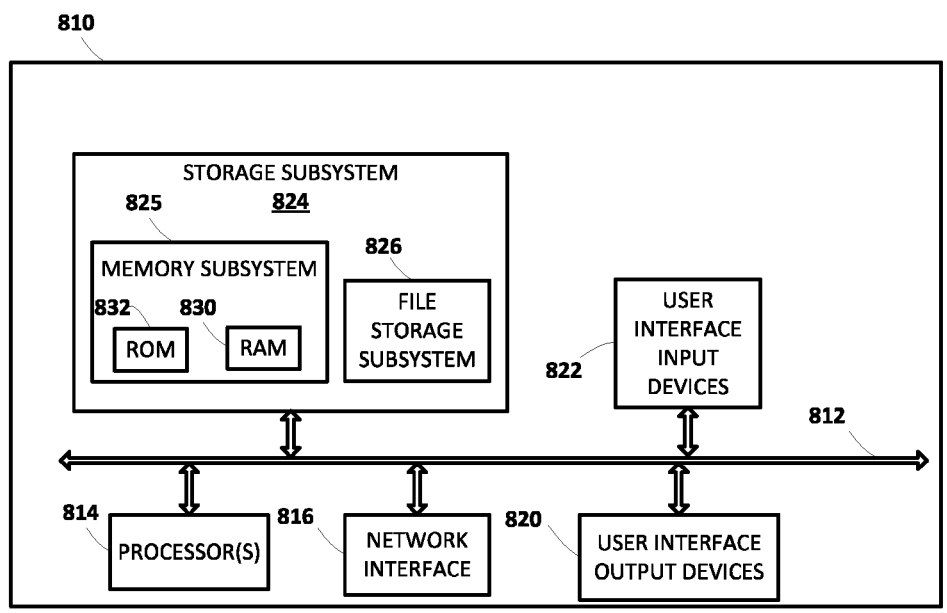
FIG. 8 schematically depicts an example architecture of a computer system.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the processes of FIGS. 3, 4, 5, 6, and/or other methods described herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method includes receiving a free-form natural language instruction describing a task for a robot, the free-form natural language instruction generated based on user interface input provided by a user via one or more user interface input devices. In some implementations, the method includes processing the free-form natural language instruction using a natural language instruction encoder, to generate a latent goal representation of the free-form natural language instruction. In some implementations, the method includes receiving an instance of vision data, the instance of vision data generated by at least one vision component of the robot, and the instance of vision data capturing at least part of an environment of the robot. In some implementations, the method includes generating output based on processing, using a goal-conditioned policy network, at least (a) the instance of vision data and (b) the latent goal representation of the free-form natural language instruction, wherein the goal-conditioned policy network is trained based on at least (i) a goal image set of training instances, in which training tasks are described using goal images, and (ii) a natural language instruction set of training instances, in which training tasks are described using free-form natural language instructions. In some implementations, the method includes controlling one or more actuators of the robot based on the generated output, wherein controlling the one or more actuators of the robot causes the robot to perform at least one action indicated by the generated output.

These and other implementations of the technology disclosed herein can include one or more of the following features.

In some implementations, the method includes receiving an additional free-form natural language instruction describing an additional task for the robot, the additional freeform natural language instruction generated based on additional user interface input provided by the user via the one or more user interface input devices. In some implementations, the method includes processing the additional free-form natural language instruction using the natural language instruction encoder, to generate an additional latent goal representation of the additional free-form natural language instruction. In some implementations, the method includes receiving an additional instance of vision data generates by the at least one vision component of the robot. In some implementations, the method includes generating, using the goal-conditioned policy network, additional output based on processing at least (a) the additional instance of vision data and (b) the additional latent goal representation of the additional free-form natural language instruction. In some implementations, the method includes controlling the one or more actuators of the robot based on the generated additional output, wherein controlling the one or more actuators of the robot causes the robot to perform at least one additional action indicated by the generated additional output.

In some implementations, the additional task for the robot is distinct from the task for the robot.

In some implementations, each training instance in the goal image set of training instances, in which training tasks are described using goal images, includes an imitation trajectory provided by a human and a goal image describing the training task performed by robot in the imitation trajectory. In some implementations, generating each training instance is the goal image set of training instances includes receiving a data stream, capturing the state of the robot and corresponding actions of the robot, while the human is controlling the robot to interact with the environment. In some implementations, the method includes, for each training instance in the goal image set of training instances, selecting a sequence of image frames from the data stream, selecting the last image frame in the sequence of image frames as a training goal image, describing the training task, performed in the sequence of image frames, and generating the training instance by storing, as the training instance, the selected sequence of image frames as the imitation trajectory portion of the training instance, and the training goal image as the goal image portion of the training instance.

In some implementations, each training instance, in the natural language instruction set of training instances, in which training are described using free-form natural language instructions, includes an imitation trajectory provided by a human and a free-form natural language instruction describing the training task performed by robot in the imitation trajectory. In some implementations, generating each training instance is the natural language instruction set of training instances includes receiving a data stream, capturing the state of the robot and corresponding actions of the robot, while the human is controlling the robot to interact with the environment. In some implementations, the method includes, for each training instance in the natural language instruction set of training instances, selecting a sequence of image frames from the data stream, providing the sequence of image frames to a human reviewer, receiving a training free-form natural language instruction describing a training task performed by the robot in the sequence of image frames, and generating the training instance by storing, as the training instance, the selected sequence of image frames as the imitation trajectory portion of the training instance, and the training free-form natural language instruction as the free-form natural language instruction portion of the training instance.

In some implementations, the goal-conditioned policy network, based on at least (i) the goal image set of training instances, in which training tasks are described using goal images, and (ii) the natural language instruction set of training instances, in which training tasks are described using free-form natural language instructions, includes selecting a first training instance from the goal image set of training instances, wherein the first training instance includes a first imitation trajectory and a first goal image describing the first imitation trajectory. In some implementations, the method includes generating a latent space representation of the first goal image by processing, using a goal image encoder, the first goal image portion of the first training instance. In some implementations, the method includes processing, using the goal-conditioned policy network, at least (1) the initial image frame in the first imitation trajectory and (2) the latent space representation of the first goal image portion of the first training instance, to generate first candidate output. In some implementations, the method includes determining a goal image loss based on the first candidate output and one or more portions of the first imitation trajectory. In some implementations, the method includes selecting a second training instance from the natural language instruction set of training instances, wherein the second training instance includes a second imitation trajectory and a second free-form natural language instruction describing the second imitation trajectory. In some implementations, the method includes generating a latent space representation of the second free-form natural language instruction by processing, using the natural language encoder, the second free-form natural language instruction portion of the second training instance, wherein the latent space representation of the first goal image and the latent space representation of the second free-form natural language instruction are represented in a shared latent space. In some implementations, the method includes processing, using the goal-conditioned policy network, at least (1) the initial image frame in the second imitation trajectory and (2) the latent space representation of the second free-form natural language instruction portion of the second training instance, to generate second candidate output. In some implementations, the method includes determining a natural language instruction loss based on the second candidate output and one or more portions of the second imitation trajectory. In some implementations, the method includes determining a goal-conditioned loss based on the goal image loss and the natural language instruction loss. In some implementations, the method includes updating one or more portions of the goal image encoder, the natural language instruction encoder, and/or the goal-conditioned policy network, based on the determined goal-conditioned loss.

In some implementations, the goal-conditioned policy network is trained, based on a first quantity of training instances of the goal image set of training instances, and a second quantity of training instances of the natural language instruction set of training instances, wherein the second quantity is less than fifty percent of the first quantity. In some implementations, the second quantity is less than ten percent of the first quantity, less than five percent of the first quantity, or less than one percent of the first quantity.

In some implementations, the generated output includes a probability distribution over an action space of the robot, and wherein controlling the one or more actuators based on the generated output comprises selecting the at least one action based on the at least one action with the highest probability in the probability distribution.

In some implementations, the generating output based on processing, using the goal-conditioned policy network, at least (a) the instance of vision data and (b) the latent goal representation of the free-form natural language instruction further includes generating output based on processing, using the goal-conditioned policy network, (c) the at least one action, and wherein controlling the one or more actuators based on the generated output comprises selecting the at least one action based on the at least one action satisfying a threshold probability.

In some implementations, a method implemented by one or more processors is provided, the method includes receiving a free-form natural language instruction describing a task for the robot, the free-form natural language instruction generated based on user interface input provided by a user via one or more user interface input devices. In some implementations, the method includes processing the free-form natural language instruction using a natural language instruction encoder, to generate a latent goal representation of the free-form natural language instruction. In some implementations, the method includes receiving an instance of vision data, the instance of vision data generated by at least one vision component of the robot, and the instance of vision data capturing at least part of an environment of the robot. In some implementations, the method includes generating output based on processing, using a goal-conditioned policy network, at least (a) the instance of vision data and (b) the latent goal representation of the free-form natural language instruction. In some implementations, the method includes controlling one or more actuators of the robot based on the generated output, wherein controlling the one or more actuators of the robot causes the robot to perform at least one action indicated by the generated output. In some implementations, the method includes receiving a goal image instruction describing an additional task for the robot, the goal image instruction provided by the user via the one or more user interface input devices. In some implementations, the method includes processing the goal image instruction using a goal image encoder, to generate a latent goal representation of the goal image instruction. In some implementations, the method includes receiving an additional instance of vision data, the additional instance of vision data generated by the at least one vision component of the robot, and the additional instance of vision data capturing at least part of the environment of the robot. In some implementations, the method includes generating additional output based on processing, using the goal-conditioned policy network, at least (a) the additional instance of vision data and (b) the latent goal representation of the goal image instruction. In some implementations, the method includes controlling the one or more actuators of the robot based on the generated additional output, wherein controlling the one or more actuators of the robot causes the robot to perform at least one additional action indicated by the generated additional output.

In some implementations, a method implemented by one or more processors is provided, the method includes selecting a first training instance from the goal image set of training instances, wherein the first training instance includes a first imitation trajectory and a first goal image describing the first imitation trajectory. In some implementations, the method includes generating a latent space representation of the first goal image by processing, using a goal image encoder, the first goal image portion of the first training instance. In some implementations, the method includes processing, using a goal-conditioned policy network, at least (1) the initial image frame in the first imitation trajectory and (2) the latent space representation of the first goal image portion of the first training instance, to generate first candidate output. In some implementations, the method includes determining a goal image loss based on the first candidate output and one or more portions of the first imitation trajectory. In some implementations, the method includes selecting a second training instance from the natural language instruction set of training instances, wherein the second training instance includes a second imitation trajectory and a second free-form natural language instruction describing the second imitation trajectory. In some implementations, the method includes generating a latent space representation of the second free-form natural language instruction by processing, using the natural language encoder, the second free-form natural language instruction portion of the second training instance, wherein the latent space representation of the first goal image and the latent space representation of the second freeform natural language instruction are represented in a shared latent space. In some implementations, the method includes processing, using the goal-conditioned policy network, at least (1) the initial image frame in the second imitation trajectory and (2) the latent space representation of the second free-form natural language instruction portion of the second training instance, to generate second candidate output. In some implementations, the method includes determining a natural language instruction loss based on the second candidate output and one or more portions of the second imitation trajectory. In some implementations, the method includes determining a goal-conditioned loss based on the goal image loss and the natural language instruction loss. In some implementations, the method includes updating one or more portions of the goal image encoder, the natural language instruction encoder, and/or the goal-conditioned policy network, based on the determined goal-conditioned loss.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:
   receiving a free-form natural language instruction describing a task for a robot, the free-form natural language instruction generated based on user interface input provided by a user via one or more user interface input devices;
   processing the free-form natural language instruction using a natural language instruction encoder, to generate a latent goal representation of the free-form natural language instruction, wherein the latent goal representation of the free-form natural language instruction is represented in a shared latent space with latent goal representations of goal images;
   receiving an instance of vision data, the instance of vision data generated by at least one vision component of the robot, and the instance of vision data capturing at least part of an environment of the robot;
   generating output based on processing, using a goal-conditioned policy network, at least (a) the instance of vision data and (b) the latent goal representation of the free-form natural language instruction,
      wherein the goal-conditioned policy network is trained based on at least:
      (i) a goal image set of training instances, in which training tasks are described using goal images, wherein one or more of the goal images comprise a last image frame of a sequence of image frames selected from a larger data stream of image frames that capture states of one or more robots and corresponding actions of the one or more robots interacting with one or more environments; and (ii) a natural language instruction set of training instances, in which training tasks are described using free-form natural language instructions; and controlling one or more actuators of the robot based on the generated output, wherein controlling the one or more actuators of the robot causes the robot to perform at least one action indicated by the generated output.

2. The method of claim 1, further comprising:

receiving an additional free-form natural language instruction describing an additional task for the robot, the additional free-form natural language instruction generated based on additional user interface input provided by the user via the one or more user interface input devices;

processing the additional free-form natural language instruction using the natural language instruction encoder, to generate an additional latent goal representation of the additional free-form natural language instruction;

receiving an additional instance of vision data generated by the at least one vision component of the robot;

generating, using the goal-conditioned policy network, additional output based on processing at least (a) the additional instance of vision data and (b) the additional latent goal representation of the additional free-form natural language instruction; and controlling the one or more actuators of the robot based on the generated additional output, wherein controlling the one or more actuators of the robot causes the robot to perform at least one additional action indicated by the generated additional output.

3. The method of claim 2, wherein the additional task for the robot is distinct from the task for the robot.

4. The method of claim 3, wherein each training instance in the goal image set of training instances, in which training tasks are described using goal images, comprises an imitation trajectory provided by a human and a goal image describing the training task performed by robot in the imitation trajectory.

5. The method of claim 1, wherein each training instance, in the natural language instruction set of training instances, in which training are described using free-form natural language instructions, comprises an imitation trajectory provided by a human and a free-form natural language instruction describing the training task performed by robot in the imitation trajectory.

6. The method of claim 5, wherein generating each training instance is the natural language instruction set of training instances comprises:

receiving a data stream, capturing the state of the robot and corresponding actions of the robot, while the human is controlling the robot to interact with the environment;

for each training instance in the natural language instruction set of training instances:

selecting a sequence of image frames from the data stream;

providing the sequence of image frames to a human reviewer;

receiving a training free-form natural language instruction describing a training task performed by the robot in the sequence of image frames;

generating the training instance by storing, as the training instance, the selected sequence of image frames as the imitation trajectory portion of the training instance, and the training free-form natural language instruction as the free-form natural language instruction portion of the training instance.

7. The method of claim 6, wherein training the goal-conditioned policy network, based on at least (i) the goal image set of training instances, in which training tasks are described using goal images, and (ii) the natural language instruction set of training instances, in which training tasks are described using free-form natural language instructions, comprises:

selecting a first training instance from the goal image set of training instances, wherein the first training instance includes a first imitation trajectory and a first goal image describing the first imitation trajectory;

generating a latent space representation of the first goal image by processing, using a goal image encoder, the first goal image portion of the first training instance;

processing, using the goal-conditioned policy network, at least (1) the initial image frame in the first imitation trajectory and (2) the latent space representation of the first goal image portion of the first training instance, to generate first candidate output;

determining a goal image loss based on the first candidate output and one or more portions of the first imitation trajectory;

selecting a second training instance from the natural language instruction set of training instances, wherein the second training instance includes a second imitation trajectory and a second free-form natural language instruction describing the second imitation trajectory;

generating a latent space representation of the second free-form natural language instruction by processing, using the natural language encoder, the second free-form natural language instruction portion of the second training instance, wherein the latent space representation of the first goal image and the latent space representation of the second free-form natural language instruction are represented in a shared latent space;

processing, using the goal-conditioned policy network, at least (1) the initial image frame in the second imitation trajectory and (2) the latent space representation of the second free-form natural language instruction portion of the second training instance, to generate second candidate output;

determining a natural language instruction loss based on the second candidate output and one or more portions of the second imitation trajectory;

determining a goal-conditioned loss based on the goal image loss and the natural language instruction loss; and updating one or more portions of the goal image encoder, the natural language instruction encoder, and/or the goal-conditioned policy network, based on the determined goal-conditioned loss.

8. The method of claim 7, wherein the goal-conditioned policy network is trained, based on a first quantity of training instances of the goal image set of training instances, and a second quantity of training instances of the natural language instruction set of training instances, wherein the second quantity is less than fifty percent of the first quantity.

9. The method of claim 8, wherein the second quantity is less than ten percent of the first quantity, less than five percent of the first quantity, or less than one percent of the first quantity.

10. The method of claim 9, wherein the generated output comprises a probability distribution over an action space of the robot, and wherein controlling the one or more actuators based on the generated output comprises selecting the at least one action based on the at least one action with the highest probability in the probability distribution.

11. The method of claim 9, wherein the generating output based on processing, using the goal-conditioned policy network, at least (a) the instance of vision data and (b) the latent goal representation of the free-form natural language instruction further comprises generating output based on processing, using the goal-conditioned policy network, (c) the at least one action, and wherein controlling the one or more actuators based on the generated output comprises selecting the at least one action based on the at least one action satisfying a threshold probability.

12. A method implemented by one or more processors, the method comprising:
    selecting a first training instance from the goal image set of training instances, wherein the first training instance includes a first imitation trajectory and a first goal image describing the first imitation trajectory;
    generating a latent space representation of the first goal image by processing, using a goal image encoder, the first goal image portion of the first training instance;
    processing, using a goal-conditioned policy network, at least (1) the initial image frame in the first imitation trajectory and (2) the latent space representation of the first goal image portion of the first training instance, to generate first candidate output;
    determining a goal image loss based on the first candidate output and one or more portions of the first imitation trajectory;
    selecting a second training instance from the natural language instruction set of training instances, wherein the second training instance includes a second imitation trajectory and a second free-form natural language instruction describing the second imitation trajectory;
    generating a latent space representation of the second free-form natural language instruction by processing, using the natural language encoder, the second free-form natural language instruction portion of the second training instance, wherein the latent space representation of the first goal image and the latent space representation of the second free-form natural language instruction are represented in a shared latent space;
    processing, using the goal-conditioned policy network, at least (1) the initial image frame in the second imitation trajectory and (2) the latent space representation of the second free-form natural language instruction portion of the second training instance, to generate second candidate output;
    determining a natural language instruction loss based on the second candidate output and one or more portions of the second imitation trajectory;
    determining a goal-conditioned loss based on the goal image loss and the natural language instruction loss; and
    updating one or more portions of the goal image encoder, the natural language instruction encoder, and/or the goal-conditioned policy network, based on the determined goal-conditioned loss.

13. A non-transitory computer-readable storage medium storing instructions executable by one or more processors of a computing system to perform the method of:
    receiving a free-form natural language instruction describing a task for a robot, the free-form natural language instruction generated based on user interface input provided by a user via one or more user interface input devices;
    processing the free-form natural language instruction using a natural language instruction encoder, to generate a latent goal representation of the free-form natural language instruction, wherein the latent goal representation of the free-form natural language instruction is represented in a shared latent space with latent goal representations of goal images;
    receiving an instance of vision data, the instance of vision data generated by at least one vision component of the robot, and the instance of vision data capturing at least part of an environment of the robot;
    generating output based on processing, using a goal-conditioned policy network, at least (a) the instance of vision data and (b) the latent goal representation of the free-form natural language instruction,
    wherein the goal-conditioned policy network is trained based on at least:
    (i) a goal image set of training instances, in which training tasks are described using goal images, wherein one or more of the goal images comprise a last image frame of a sequence of image frames selected from a larger data stream of image frames that capture states of one or more robots and corresponding actions of the one or more robots interacting with one or more environments; and
    (ii) a natural language instruction set of training instances, in which training tasks are described using free-form natural language instructions; and
    controlling one or more actuators of the robot based on the generated output, wherein controlling the one or more actuators of the robot causes the robot to perform at least one action indicated by the generated output.

* * * * *